United States Patent
Siomina et al.

(10) Patent No.: US 9,433,004 B2
(45) Date of Patent: Aug. 30, 2016

(54) METHODS AND NODES FOR COORDINATING UPLINK TRANSMISSIONS IN A WIRELESS COMMUNICATION NETWORK

(75) Inventors: Iana Siomina, Solna (SE); Robert Baldemair, Solna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 89 days.

(21) Appl. No.: 14/238,247

(22) PCT Filed: Jun. 29, 2012

(86) PCT No.: PCT/SE2012/050752
§ 371 (c)(1),
(2), (4) Date: Feb. 11, 2014

(87) PCT Pub. No.: WO2013/025158
PCT Pub. Date: Feb. 21, 2013

(65) Prior Publication Data
US 2014/0198766 A1    Jul. 17, 2014

Related U.S. Application Data

(60) Provisional application No. 61/522,810, filed on Aug. 12, 2011.

(51) Int. Cl.
*H04W 4/00* (2009.01)
*H04W 72/08* (2009.01)
(Continued)

(52) U.S. Cl.
CPC .......... *H04W 72/082* (2013.01); *H04L 5/0053* (2013.01); *H04L 5/0073* (2013.01); *H04L 5/0048* (2013.01); *H04W 16/10* (2013.01); *H04W 72/0426* (2013.01)

(58) Field of Classification Search
None
See application file for complete search history.

(56) References Cited

U.S. PATENT DOCUMENTS

| 2009/0221295 A1 | 9/2009 | Sahin et al. |
| 2009/0264077 A1* | 10/2009 | Damnjanovic .............. 455/63.1 |
| 2010/0216486 A1* | 8/2010 | Kwon et al. .............. 455/452.2 |

FOREIGN PATENT DOCUMENTS

| EP | 1 806 942 A1 | 7/2007 |
| EP | 2 140 702 B1 | 12/2010 |

(Continued)

OTHER PUBLICATIONS

3GPP TSG RAN WG3 Meeting #61 bis; Agenda Item: 10.1.2.a; Source: picoChip Designs Ltd.; Document for: Discussion; Prague, Czechia, Sep. 30-Oct. 3, 2008.

(Continued)

*Primary Examiner* — Willie J Daniel, Jr.
(74) *Attorney, Agent, or Firm* — Baker Botts, LLP

(57) ABSTRACT

Methods and nodes for coordinating uplink transmissions in a victim cell and in an aggressor cell. The uplink transmissions in the aggressor cell potentially cause interference at a victim radio node receiving or measuring uplink signals transmitted in the victim cell. A coordinating node obtains (200) an indication of an uplink pattern of interference-protected resources in frequency and time where uplink transmissions are allowed to be scheduled in the victim cell but not in the aggressor cell. The coordinating node then signals (202) the indication to an aggressor radio node serving the aggressor cell and/or to the victim radio node. When a radio node receives (204) the signaled indication, it uses (206) the uplink pattern for scheduling uplink transmissions in one or both of the victim cell and the aggressor cell, or for configuring a measurement or signal reception. The coordinating node may be the victim radio node (302), or the aggressor radio node (300), or a network node (304) signalling the indication to one or both of the victim radio node and the aggressor radio node.

30 Claims, 7 Drawing Sheets

(51) Int. Cl.
    *H04W 16/10*    (2009.01)
    *H04L 5/00*     (2006.01)
    *H04W 72/04*    (2009.01)

(56) References Cited

FOREIGN PATENT DOCUMENTS

| WO | WO 2011/029469 | 3/2011 |
| WO | WO 2011/031195 | 3/2011 |

OTHER PUBLICATIONS

3rd Generation Partnership Project; Technical specification Group Radio Access Network; Evolved Universal Terrestrial Radio Access (E-UTRA); TDD Home eNode B (HeNB) Radio Frequency (RF) requirements analysis (Release 9), 2010.
3rd Generation Partnership Project; Technical Specification Group Radio Access Network; Stage 2 Functional Specification of User Equipment (UE) Positioning in UTRAN (Release 10), 2010.
PCT International Preliminary Report on Patentability for International Application No. PCT/SE2012/050752; International Filing Date Jun. 29, 2012.
PCT International Search Report for International Application No. PCT/SE2012/050752; International Filing Date Jun. 29, 2012.
PCT Written Opinion of the International Preliminary Examining Authority for International Application No. PCT/SE2012/050752; International Filing Date Jun. 29, 2012.
PCT Written Opinion of the International Searching Authority for International Application No. PCT/SE2012/050752; International Filing Date Jun. 29, 2012.
3GPP TSG RAN WG1 Meeting #61; Agenda Item: 6.8; Source: Ericsson, ST-Ericsson; Document for: Discussion; Montreal, Canada, May 10-14, 2010.
Guang Han, et al., "*Avoiding Data Channel Femto-Macro Interference*", IEEE 802.16 Broadband Wireless Access Working Group, XP007908600, IEEE C802.16m-08/1366r1, 3 pages, Nov. 12, 2008.
NTT DOCOMO, "*Downlink Interference Coordination Between eNodeB and Home eNodeB*", Agenda Item 9.7 Discussion, TSG-RAN Working Group 4 (Radio) meeting #52, R4-093244, Shenzhen, CN, 8 pages, Aug. 24-28, 2009.
Motorola, "*Femtocell and Macrocell Interference Coordination based on SFR*", Agenda Item 9.7, 3GPP TSG-RAN WG4 #52, R4-093349, Shenzhen, CN, 3 pages, Aug. 24-28, 2009.
LG Electronics, "*Considerations on interference coordination in heterogeneous networks*", Agenda Item 8.2.3 Discussion, R1-100236, Valencia, Spain, 5 pages, Jan. 18-22, 2010.
PCT, Written Opinion of the International Preliminary Examining Authority (PCT Rule 66), International Application No. PCT/SE2012/050752, 7 pages, Jul. 22, 2013.

* cited by examiner

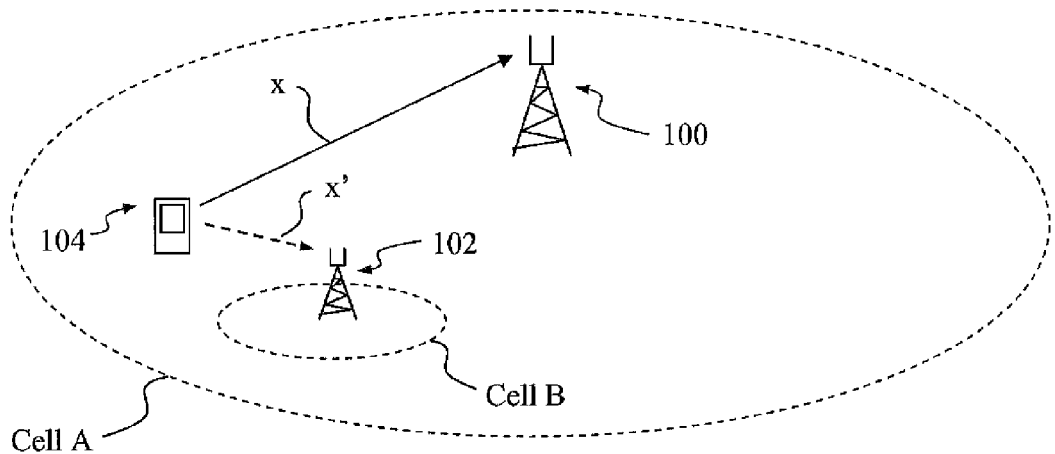
Fig. 1 (Prior art)
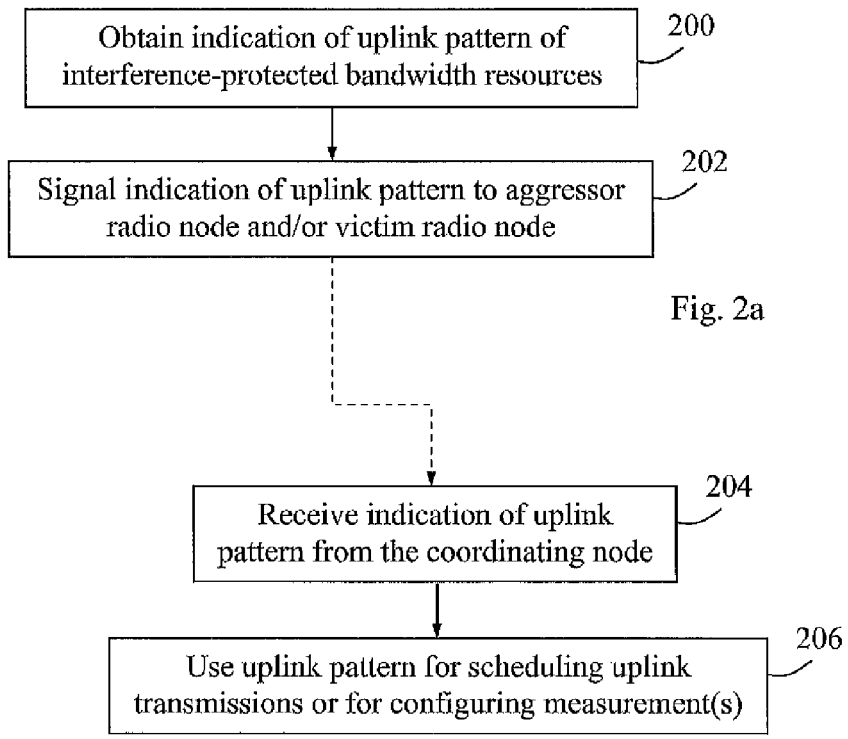
Fig. 2a
Fig. 2b

METHODS AND NODES FOR COORDINATING UPLINK TRANSMISSIONS IN A WIRELESS COMMUNICATION NETWORK

PRIORITY

This nonprovisional application is a U.S. National Stage. Filing under 35 U.S.C. §371 of International Patent Application Serial No, PCT/SE2012/050752, filed Jun. 29, 2012 and entitled "Methods and Nodes for Coordinating Uplink Transmissions in A Wireless Communication Network," which claims the benefit of U.S. Provisional Application No. 61/522,810, filed Aug. 12, 2011 and entitled Method and Arrangement for Uplink Interference Mitigation in Heterogeneous Networks."

TECHNICAL FIELD

The present disclosure relates generally to methods and nodes of a wireless communication network, for coordinating uplink transmissions in a victim cell and in an aggressor cell such that interference between the uplink transmissions in said cells can be mitigated or avoided.

BACKGROUND

In cellular networks for wireless communication, interference often occurs in a cell caused by uplink signals transmitted from User Equipments, UEs in nearby located cells, which is a well-known problem. In such a network, the available frequency bandwidth is limited and in order to provide capacity for communications in the network having multiple cells, uplink radio resources in frequency and time must be shared in two or more cells in a way so as to not disturb the communication for one another. In this context, cells that are located near a serving cell are generally referred to as "neighboring cells" and uplink transmissions by UEs in neighboring cells may potentially disturb transmissions by UEs in the serving cell, and vice versa, thus causing interference at the receiving radio node. The term "radio node" will be used here to represent any node in a communication network that is capable of communicating with UEs by receiving uplink radio signals transmitted from the UEs. Other terms than radio node commonly used in this field include base station, node B, evolved node B (eNB), base transceiver station, and so forth.

This disclosure is relevant for cellular networks using any of the following radio access technologies: Orthogonal Frequency Division Multiplexing (OFDM), Single Carrier-Frequency Division Multiple Access (SC-FDMA), Orthogonal Frequency Division Multiple Access (OFDMA), Time Division Multiplex (TDM), and Frequency Division Multiplex (FDM). Further, radio resources defined by frequency and time will be referred to as "resources" for short in the following description. Typically, resources for radio transmission can be defined by any combination of frequency bands and time intervals. In systems of Long Term Evolution, LTE, the resources are sometimes referred to as Physical Resource Blocks, PRBs, defined by frequency and time interval.

A general problem in cellular networks is that the performance in communications may be degraded and the network capacity may also be reduced, due to interference when the same time-frequency resources are reused for uplink transmissions in multiple nearby cells. This problem is common for networks with a so-called heterogeneous cell configuration where the coverage areas of large cells, e.g. macro cells, completely or partly overlap with the coverage areas of smaller cells, e.g. pico cells, micro cells and femto cells. These cell configurations thus form a layered or hierarchical cell structure and a simplified example of how interference can occur in such a heterogeneous cell configuration is illustrated in FIG. 1.

In FIG. 1, a large macro cell A is covered by a radio node 100 and a small pico cell B located within cell A is covered by another radio node 102. Typically, UEs connected to and served by a radio node of a macro cell need to use high output power for their uplink transmissions due to the often large distance to the serving radio node, while UEs connected to and served by a radio node of a pico cell, a micro cell or a femto cell only need to use low output power for their uplink transmissions thanks to the much shorter distance to the serving radio node.

In this example, a UE 104 is connected to the radio node 100 of the macro cell A and transmits an uplink signal denoted x with high power to the radio node 100. This signal x is also received as an interfering signal denoted x' at the radio node 102 of the pico cell B. Since the UE 104 is located substantially closer to radio node 102 than to the radio node 100 in this case, the interfering signal x' will be received with high signal strength at radio node 102 and therefore cause high interference with any other uplink signals in the pico cell B if transmitted on the same resource in frequency and time. Any UE connected to the radio node 102 only needs to transmit signals with low power which are therefore easily interfered by the stronger signal x' from UE 104. It is thus a problem that uplink signals transmitted in large cells may often cause interference to uplink transmissions in small cells. In this context, the terms "large" and "small" cells should be understood to be relative in terms of inter-cell interference, and e.g. a macro cell is typically a large cell compared to a micro, pico or femto cell, while a micro cell may also be regarded as a large cell compared to a pico cell, and so forth.

In the following, a cell where uplink transmissions of high output power may cause inter-cell interference will be referred to as an "aggressor cell" which is typically but not necessarily a macro cell or similar, while a cell where uplink transmissions of low output power may be disturbed by inter-cell interference will be referred to as a "victim cell" which could be a micro, pico or femto cell or similar. Correspondingly, the radio node of the aggressor cell will in this description be called the "aggressor radio node" and the radio node serving the victim cell or receiving measurement signals transmitted in the victim cell will be called the "victim radio node". It should be noted that the latter victim radio node may be any radio node receiving radio signals potentially subjected to interference, e.g. an eNB or base station to which UEs in the victim cell are connected and transmit such signals, or other radio node, e.g. a Location Measurement Unit LMU, that just performs measurements on uplink signals transmitted from UEs in the victim cell without actually serving the victim cell.

ABBREVIATIONS

ACK Acknowledgement
ARQ Automatic Repeat Request
CSG Closed Subscriber Group
DL Downlink
DFTS-OFDM Discrete Fourier Transform Spread-OFDM
FDD Frequency-Division Duplex
OFDM Orthogonal Frequency Domain Modulation PDCCH Physical Downlink Control Channel
PUCCH Physical Uplink Control Channel
PUSCH Physical Uplink Shared Channel
RSRP Reference Signal Received Power
NACK Negative Acknowledgement
RAN Radio Access Network
RAT Radio Access Technology
SC-FDMA Single-Carrier-Frequency Division Multiple Access
SRS Sounding Reference Signals
TDD Time-Division Duplex
UE User Equipment
UL Uplink
A-GPS Assisted GPS
A-GNSS Assisted global navigational satellite system
BS Base Station
CRS Cell-specific Reference Signal
eNodeB evolved Node B
E-SMLC Evolved SMLC
LPP LTE Positioning Protocol
LPPa LPP Annex
LTE Long-Term Evolution
E-CID Enhanced cell ID
OTDOA Observed Time Difference Of Arrival
UTDOA Uplink time difference of arrival
SMLC Serving Mobile Location Center
LMU Location measurement unit
LPP LTE Positioning Protocol
LPPa LPP Annex
TA Timing advance

SUMMARY

It is an object of embodiments herein to address at least some of the problems and issues outlined above. It is possible to achieve these objects and others by using a method and a coordinating node as defined in the attached independent claims.

According to one aspect, a method is provided in a coordinating node of a wireless communication network, for coordinating uplink transmissions in a victim cell and in an aggressor cell. The uplink transmissions in the aggressor cell potentially cause interference at a victim radio node receiving or measuring uplink signals transmitted in the victim cell. In this method, the coordinating node obtains an indication of an uplink pattern of interference-protected resources in one or both of frequency and time where uplink transmissions are allowed to be scheduled in the victim cell but not in the aggressor cell. The coordinating node then signals the indication of the uplink pattern to at least one of an aggressor radio node serving the aggressor cell and the victim radio node. Thereby, mitigation of interference caused by uplink transmissions in the aggressor cell is enabled when receiving or measuring uplink signals on the interference-protected resources at the victim radio node, since uplink transmissions are not allowed to be scheduled on the interference-protected resources in the aggressor cell.

According to another aspect, a coordinating node of a wireless communication network is provided. The coordinating node is configured to coordinate uplink transmissions in a victim cell and in an aggressor cell, wherein the uplink transmissions in the aggressor cell potentially cause interference at a victim radio node receiving or measuring uplink signals transmitted in the victim cell. The coordinating node comprises a logic unit adapted to obtain an indication of an uplink pattern of interference-protected resources in one or both of frequency and time where uplink transmissions are allowed to be scheduled in the victim cell but not in the aggressor cell. The coordinating node also comprises a signaling unit adapted to signal the indication of the uplink pattern to at least one of an aggressor radio node serving the aggressor cell and the victim radio node. Thereby, mitigation of interference caused by uplink transmissions in the aggressor cell is enabled when receiving or measuring uplink signals on the interference-protected resources at the victim radio node.

According to another aspect, a method is provided in a radio node of a wireless communication network, for scheduling or configuring for uplink transmissions in one or both of a victim cell and in an aggressor cell. The uplink transmissions in the aggressor cell potentially cause interference at a victim radio node receiving or measuring uplink signals transmitted in the victim cell. In this method, the radio node receives an indication of an uplink pattern of interference-protected resources in one or both of frequency and time where uplink transmissions are allowed to be scheduled in the victim cell but not in the aggressor cell. The radio node then uses the uplink pattern for scheduling uplink transmissions in one or both of the victim cell and the aggressor cell, or for configuring at least one measurement or signal reception according to the uplink pattern.

According to another aspect, a radio node of a wireless communication network is provided. The radio node is configured to schedule or configure for uplink transmissions in one or both of a victim cell and in an aggressor cell, wherein the uplink transmissions in the aggressor cell potentially cause interference at a victim radio node receiving or measuring uplink signals transmitted in the victim cell. The radio node comprises a receiving unit adapted to receive an indication of an uplink pattern of interference-protected resources in one or both of frequency and time where uplink transmissions are allowed to be scheduled in the victim cell but not in the aggressor cell. The radio node also comprises a using unit adapted to use the uplink pattern for scheduling uplink transmissions in one or both of the victim cell and the aggressor cell, or for configuring at least one measurement or signal reception according to the uplink pattern.

The above method and coordinating node may be configured and implemented according to different optional embodiments which will be outlined in the following detailed description.

BRIEF DESCRIPTION OF DRAWINGS

The solution will now be described in more detail by means of illustrative examples of embodiments and with reference to the accompanying drawings, in which:

FIG. 1 is a communication scenario illustrating how uplink interference can occur in a heterogeneous cell configuration, according to the prior art.

FIG. 2a is a flow chart illustrating a procedure in a coordinating node for coordinating uplink transmissions, according to some possible embodiments.

FIG. 2b is a flow chart illustrating a procedure in a radio node for scheduling uplink transmissions, according to some possible embodiments.

DETAILED DESCRIPTION

Figure 3A:
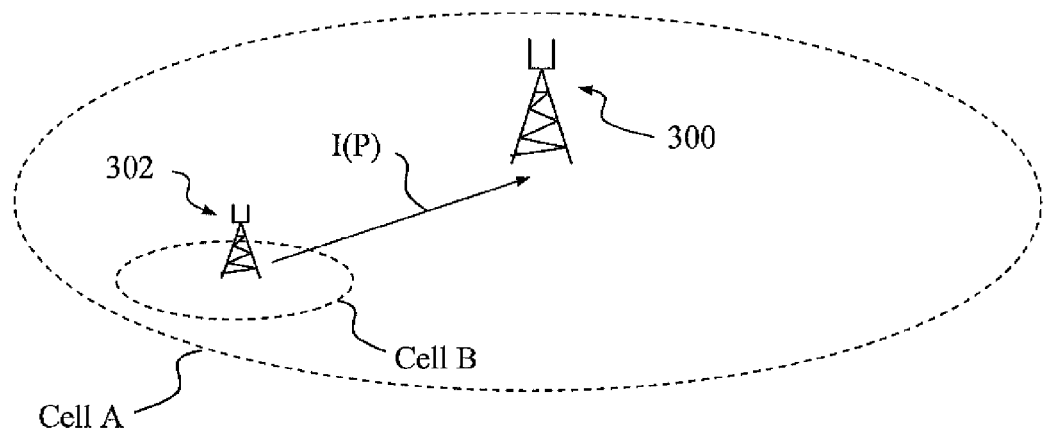
FIGS. 3a-c show some examples of communication scenarios illustrating how uplink interference can be mitigated or avoided, according to some possible embodiments.

Briefly described, a solution is provided that can be used in a wireless communication network to mitigate or even avoid interference on received uplink signals in a victim radio node caused by uplink transmissions from UEs in an aggressor cell, the victim radio node e.g. serving a victim cell or measuring uplink signals transmitted in the victim cell. This solution can be put into practice by means of a coordinating node of the network which is configured to coordinate uplink transmissions in the victim cell and in the aggressor cell in a manner to be described below. It is assumed that the uplink transmissions in the aggressor cell can potentially cause interference at the victim radio node. For example, low output power may be required for uplink transmissions in the victim cell and high output power may mostly be required for the uplink transmissions in the aggressor cell, thus potentially causing interference at the victim radio node particularly when the victim radio node receives signals weaker than the interfering transmissions in the aggressor cell.

Further, "coordinating node" is used here as a functional term to indicate what can be accomplished, i.e. coordination of uplink transmissions in the victim cell and in the aggressor cell for mitigating or avoiding the interference, described in the background above, from transmissions in the aggressor cell. The coordinating node may be located and implemented at a victim radio node, an aggressor radio node, or at some third network node apart from the victim and aggressor radio nodes, to be described below.

The solution will now be briefly outlined with reference to the flow chart in FIG. 2a. The procedure illustrated in FIG. 2a is performed in a coordinating node of a wireless communication network, for coordinating uplink transmissions in a victim cell and in an aggressor cell. It is assumed that the uplink transmissions in the aggressor cell potentially cause interference at a victim radio node receiving or measuring uplink signals transmitted in the victim cell.

In a first action 200, the coordinating node obtains an indication of an uplink pattern of interference-protected resources in one or both of frequency and time where uplink transmissions are allowed to be scheduled in the victim cell but not in the aggressor cell. The uplink pattern may have been configured for a specific type of signals and may be periodic, i.e. repeatable with a certain periodicity, which will be described in more detail later below. A next action 202 illustrates that the coordinating node signals the indication of the uplink pattern to at least one of an aggressor radio node serving the aggressor cell and the victim radio node. Thereby, the coordinating node enables mitigation of interference caused by uplink transmissions in the aggressor cell when receiving uplink signals on the interference-protected resources at the victim radio node.

FIG. 2b illustrates a procedure performed in a radio node of a wireless communication network configured to schedule uplink transmissions in one or both of the victim cell and the aggressor cell, which procedure follows after action 202 above as indicated by the dashed arrow. In an action 204, the radio node receives the indication of the uplink pattern of interference-protected resources that was sent in action 202 above. The radio node then uses the uplink pattern, in a further action 206, for scheduling uplink transmissions in one or both of the victim cell and the aggressor cell, or for configuring at least one measurement or signal reception according to the uplink pattern. In this way, interference caused by uplink transmissions in the aggressor cell can be mitigated or even avoided when uplink signals are received on the interference-protected resources at the victim radio node.

Figure 3B:
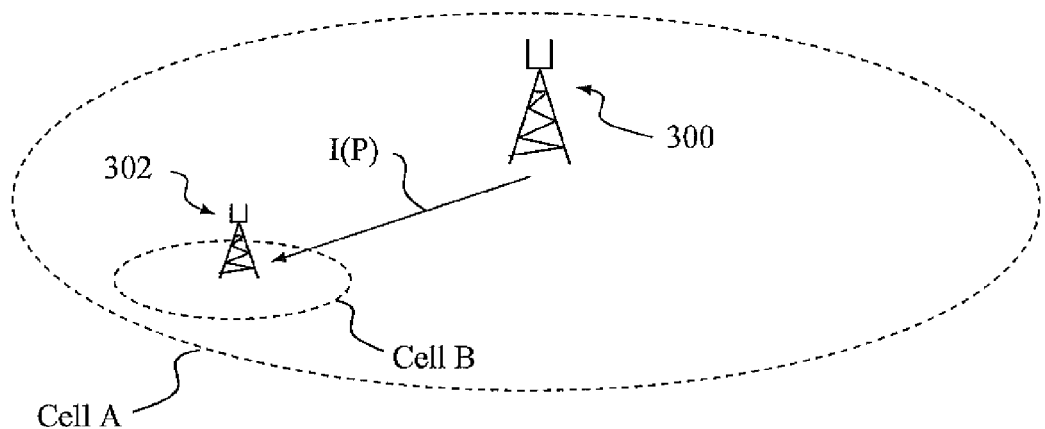
Figure 3C:
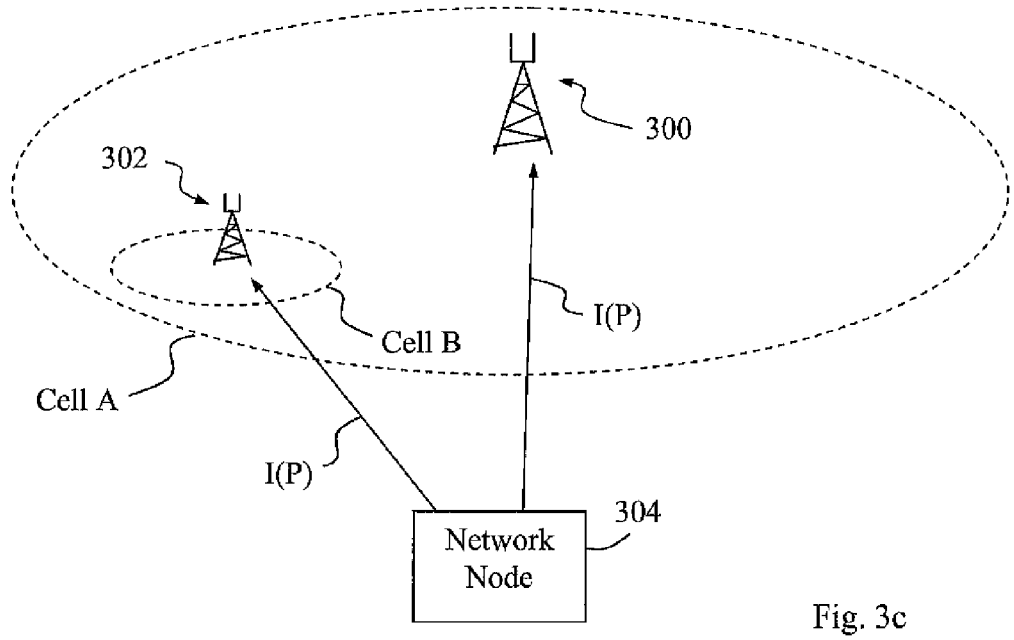

FIGS. 3a-c illustrate an aggressor radio node 300 of an aggressor cell A and a victim radio node 302 of a victim cell B, as well as some possible alternatives of how the coordinating node can be implemented in practice to accomplish the solution. It should be noted that the victim radio node 302 in these figures may be either a radio node serving the victim cell B, such as an eNB or a base station, or a measuring radio node performing measurements on uplink signals transmitted in the victim cell without serving the cell B, such as an LMU. It is also possible that a measuring radio node is integrated to coincide with the radio node serving the victim cell B.

In a first alternative shown in FIG. 3a, the above-described coordinating node is implemented in the victim radio node 302 and signals the indication I(P) of the uplink pattern to the aggressor radio node 300. In a second alternative shown in FIG. 3b, the coordinating node is instead implemented in the aggressor radio node 300 and signals the indication I(P) of the uplink pattern to the victim radio node 302. FIG. 3c finally illustrates a third alternative where the coordinating node is implemented in a network node 304 that signals the indication I(P) of the uplink pattern to one or both of the victim radio node 302 and the aggressor radio node 300. In this embodiment, the network node 304 may be any of a network monitoring node, an Operation and Support System OSS node, an Operation and Maintenance O&M node, a positioning node, and a gateway node.

Several optional embodiments and features are possible to employ within the scope of this solution. For example, the interference-protected resources may be used in the victim cell for at least one of: transmission of signals on the Physical Uplink Shared Channel PUSCH, transmission of signals on the Physical Uplink Control Channel PUCCH, and transmission of Sounding Reference Signals SRS from a UE or a group of UEs to be measured by the victim radio node. Some more detailed examples of how interference-protected resources can be used will be described later below.

In another possible example, the uplink pattern may comprise different interference-protected resources configured for transmissions on different PUCCH formats where an interference-protected resource is configured for a specific PUCCH format. In that case, the uplink pattern may comprise different subsets of interference-protected resources configured for either semi-static PUCCH signaling or dynamic PUCCH signaling. One subset of interference-protected resources may thus be configured for semi-static PUCCH signaling and another subset of interference-protected resources may be configured for dynamic PUCCH signaling. In this embodiment, the uplink pattern can be considered to include two "sub-patterns", one for semi-static PUCCH signaling and another one for dynamic PUCCH signaling.

In another possible example, the interference-protected resources of the uplink pattern may comprise one or more Single-Carrier Frequency Division Multiple Access, SC-FDMA symbols in a subframe which SC-FDMA symbols are configured for SRS transmissions.

In another possible example, the signaled indication of the uplink pattern may specify at least one of: the interference-protected resources, non-protected resources where uplink transmissions are allowed in the aggressor cell, and a reference to the uplink pattern. The latter mentioned reference may also be called a "configuration index" as in some examples to be described later below. This reference could be, e.g., a simple code or "name" of the uplink pattern, or may comprise one or more parameters characterizing the uplink pattern which may refer to the pattern's periodicity, length, reference time, and so forth.

In another possible example, the uplink pattern may be selected from a set of predefined uplink patterns that have been configured in the coordinating node, thereby obtaining the uplink pattern, or the uplink pattern may be configured by a set of predefined parameters. Further, the uplink pattern may be selected based on a current traffic load in at least one of the victim cell and the aggressor cell. For example, if the current traffic load is high in the victim cell but not in the aggressor cell, an uplink pattern with much interference-protected resources may be selected. On the other hand, if the current traffic load is low in the victim cell, an uplink pattern with less interference-protected resources may be selected instead to allow more unprotected resources to be used for uplink transmissions in the aggressor cell if needed.

The signaled indication of the uplink pattern may indicate whether the interference-protected resources should be used in the victim cell for PUSCH transmissions, PUCCH transmissions or SRS transmissions, respectively. The uplink pattern may be defined in different ways, e.g. depending on the standards and protocols used, as indicated by the signaled indication of the uplink pattern. In some possible examples, the signaled indication of the uplink pattern may indicate at least one of: one or more frame numbers, one or more subframe numbers, one or more timeslot numbers, one or more SC-FDMA symbol numbers, one or more resource blocks, one or more frequency bands, one or more subcarrier numbers, a periodicity of the uplink pattern, a start reference time of the uplink pattern, and at least one parameter characterizing the uplink pattern. In the latter case, the at least one characterizing parameter may, in some examples, refer to any of the pattern's periodicity, length and reference time. The start reference time of the uplink pattern may be expressed in terms of a System Frame Number, SFN. Further examples of such characterizing parameters will be described later below.

The above-mentioned start reference time of the uplink pattern may be linked to a reference time of a downlink pattern used for mitigating interference between downlink transmissions in the aggressor cell and in the victim cell. For example, the start reference time of the uplink pattern may occur a certain number of subframes before or after the start reference time of the downlink pattern. Generally speaking, the reference time may be a start reference time of the downlink pattern and the start reference time of the uplink pattern may be linked to the start reference time of the downlink pattern by a predefined relation. It is also possible that separate, i.e. different, start reference times of the uplink pattern are used for at least two of PUSCH transmissions, PUCCH transmissions and SRS transmissions, respectively.

In another possible example, the signaled indication of the uplink pattern may comprise a bitmap with bits indicating protected and non-protected resources. In this example, the bitmap may comprise rows pertaining to the frequency domain, and columns pertaining to the time domain, or conversely the bitmap rows may pertain to the time domain and the bitmap columns may pertain to the frequency domain. Further, the bitmap may comprise a first bit string indicating the protected and non-protected resources in time domain, and a second bit string indicating the protected and non-protected resources in frequency domain. When using a bitmap, a first type of bits. i.e. either 1 or 0, may be used to indicate protected resources in the bitmap and a second opposite type of bits. i.e. either 0 or 1, may be used to indicate non-protected resources in the bitmap. Thus, in one alternative, 1 indicates protected resources and 0 indicates non-protected resources in the bitmap. In another alternative, 0 indicates protected resources and 1 indicates non-protected resources in the bitmap.

In another possible example, the victim radio node may signal information regarding current usage of the interference-protected resources in the victim cell, to the aggressor radio node, thereby enabling the aggressor radio node to at least partly use any interference-protected resources not used in the victim cell. This will be described in more detail later below. In this embodiment, the victim radio node may signal the information regarding current usage of interference-protected resources directly to the aggressor radio node or indirectly via some third node in the network.

In another possible example, the uplink pattern may comprise any of a transmit pattern, a receive pattern and a measurement pattern, or into all three of the above. In that case, at least one of the transmit pattern, receive pattern and measurement pattern may be associated with a cell identity (cell ID) of either the victim cell or the aggressor cell. The use of transmit pattern, receive pattern and measurement pattern as the uplink pattern will be explained in more detail later below.

In another possible example, the indication of the uplink pattern is signaled to at least one UE. The indication of the uplink pattern may additionally or alternatively be signaled to a positioning node, thereby enabling the positioning node to configure one or more UE or radio node positioning measurements in accordance with the uplink pattern. Such positioning measurements may be made on SRS or signals transmitted on the PUSCH. Further, the positioning node may be e.g. an eNodeB, base station or LMU. In LTE, the positioning node may however be located in the core network and does not typically communicate radio signals itself.

In further possible examples, the uplink transmissions in the victim cell may comprise SRS, and the uplink transmission in the aggressor cell may comprise one or more of: PUSCH, PUCCH and SRS.

The solution described herein may be employed in a situation where low output power is required or configured for the uplink transmissions in the victim cell and high output power is mostly required or configured for the uplink transmissions in the aggressor cell. In another possible example, uplink transmissions may not be allowed on the interference-protected resources in the aggressor cell for UEs requiring an output power above a predefined threshold. Expressed differently, uplink transmissions may be allowed in the aggressor cell for UEs requiring an output power below a predefined threshold.

To mention a few non-limiting examples, the aggressor cell may be served by a macro radio base station or by a femto radio base station. Further, the victim cell may be served by a pico radio base station or by a micro radio base station or other small radio base station. Further possible examples of radio nodes that can be used in different embodiments will be mentioned in the following description.

In the following, various examples of techniques and embodiments which can be used when employing the solution, will be described in more detail.

To transmit data in the uplink in an LTE system, the UE has to be assigned an uplink resource for data transmission on the PUSCH. In contrast to a data assignment in downlink, in the uplink the assignment must always be consecutive in frequency, this to retain the single carrier property of the uplink. In Rel-10 this restriction has, however, been relaxed enabling non-contiguous uplink transmissions of two clusters. To provide frequency diversity of contiguous uplink transmissions frequency hopping can be applied across slot boundaries.

The term "cluster" will now be explained. So-called "CoMP" transmission and reception refers to a system where the transmission and/or reception at multiple, geographically separated antenna sites is coordinated in order to improve system performance. More specifically, CoMP refers to coordination of antenna arrays that have different geographical coverage areas. The coordination between points can either be distributed, by means of direct communication between the different sites, or by means of a central coordinating node. A further coordination possibility is a "floating cluster" where each transmission point is connected to, and coordinates, a certain set of neighbors (e.g. two neighbors). A set of points that perform coordinated transmission and/or reception is referred to as a CoMP coordination cluster, a coordination cluster, or simply as a "cluster". Further, an antenna or antenna array covering a certain geographical area is generally referred to as a "point", or more specifically a transmit and/or receive point.

The middle Single-Carrier Frequency Division Multiple Access (SC-FDMA) (also known as DFTS-OFDM) symbol in each slot is used to transmit demodulation reference signals. If the mobile terminal has been assigned an uplink resource for data transmission and at the same time instance has control information to transmit, it will transmit the control information together with the data on PUSCH. In Rel-10 simultaneous transmission of PUSCH and control information on PUCCH is also supported.

Hybrid-ARQ acknowledgements are used to acknowledge the reception of one (or two in case of spatial multiplexing) transport blocks in the downlink. Instead of hybrid-ARQ bits also the terms ACK/NACK bits can be used. The PUCCH format used for hybrid-ARQ feedback is PUCCH Format 1a/b.

Scheduling requests are used to request resources for uplink data transmission. Obviously, a scheduling request should only be transmitted when the terminal is requesting resources, otherwise the terminal should be silent in order to save battery resources and not create unnecessary interference. Hence, unlike hybrid-ARQ acknowledgements, no explicit information bit is transmitted by the scheduling request; the information is instead conveyed by the presence (or absence) of energy on the corresponding PUCCH. However, the scheduling request, although used for a completely different purpose, share the same PUCCH format as the hybrid-ARQ acknowledgement. This format is referred to as PUCCH format 1 in the specifications.

A PUCCH format 1 resource, used for either a hybrid-ARQ acknowledgement or a scheduling request, is represented by a single scalar resource index.

For hybrid-ARQ transmission, the resource index to use for transmission of the hybrid-ARQ acknowledgement is given implicitly by the downlink control signaling used to schedule the downlink transmission to the terminal. Thus, the resources to use for an uplink hybrid-ARQ acknowledgement vary dynamically and depend on the downlink control channel used to schedule the terminal in each subframe.

In addition to dynamic scheduling by using the PDCCH, there is also the possibility to semi-persistently schedule a terminal according to a specific pattern. In this case the configuration of the semi-persistent scheduling pattern includes information on the PUCCH index to use for the hybrid-ARQ acknowledgement. This is also true for scheduling requests, where configuration information informs the terminal which PUCCH resources to use for transmission of scheduling requests. PUCCH resources used for scheduling request of semi-persistent scheduling are static PUCCH Format 1 resources.

Thus, to summarize, PUCCH format 1 resources are split into two parts:
  Semi-static part, used for scheduling requests and hybrid-ARQ acknowledgements from semi-persistent users. The amount of resources used for the semi-static part of PUCCH 1 resources does not vary dynamically.
  Dynamic part, used for dynamically scheduled terminals. As the number of dynamically scheduled terminals varies, the amount of resources used for the dynamic PUCCH varies.

Channel status reports are used to provide the eNodeB with an estimate of the downlink channel properties at the terminal in order to aid downlink channel-dependent scheduling. The status report comprises downlink channel state information (CSI) reports. Examples of status reports are CQI, rank indicator (RI) and precoding matrix indicator (PMI). A channel status report consists of multiple bits per subframe. PUCCH format 1, which is capable of at most two bits of information per subframe, can obviously not be used for this purpose. Transmission of channel status reports on the PUCCH is instead handled by PUCCH Format 2, which is capable of multiple information bits per subframe. The PUCCH formats 2a/2b may also be used for transmitting CSI along with HARQ-ACK/NACK. The PUCCH Format 2/2a/2b resources are semi-statically configured.

PUCCH Format 3 resources used to feedback SCell or carrier aggregation hybrid-ARQ bits are semi-statically configured and the PDCCH only selects one of the semi-statically configured resources.

When employing resource-block mapping for PUCCH, the PUCCH is transmitted on a resource-block pair with one resource block in each slot. The resource-block pair to use is determined from the PUCCH resource index. Thus, the resource-block number to use in the first and second slot of a subframe can be expressed as $$RBnumber(i) = f(PUCCH\ index, i)$$

where i is the slot number (0 or 1) within the subframe and f is a function found in the specification.

Multiple resource-block pairs can be used to increase the control-signaling capacity; when one resource-block pair is full the next PUCCH resource index is mapped to the next resource-block pair in sequence. The mapping is in principle done such that PUCCH Format 2 is transmitted closest to the edges of the uplink cell bandwidth with the semi-static part of PUCCH Format 1 next and finally the dynamic part of PUCCH format 1 in the innermost part of the bandwidth.

Four semi-static parameters are used to determine the resources to use for the PUCCH formats 1 and 2:

$N_{RB}^{(2)}$, provided as part of the system information, controls on which resource-block pair the mapping of PUCCH Format 1 starts.

$N_{PUCCH}^{(1)}$ controls the split between the semi-static and dynamic part of PUCCH Format 1.

$N_{CS}^{(1)}$ controls the mix of Format 1 and Format 2 in one resource block. In most cases, the configuration is done such that the two PUCCH formats are mapped to separate sets of resource blocks, but there is also a possibility to have the border between Format 1 and Format 2 within a resource block.

$\Delta_{SHIFT}^{PUCCH}$ determines the capacity of PUCCH, i.e. how many PUCCH resources are available per resource block.

PUCCH Format 3 resources are determined by the semi-static list parameter $N_{pucch}^{(3,p)}$.

PUSCH and the corresponding uplink demodulation reference signals are only transmitted within the scheduled bandwidth. This provides the eNodeB with uplink channel status information within the scheduled bandwidth but not outside.

To obtain also channel status information outside the scheduled bandwidth eNodeB can configure a UE with SRS. The SRS present since LTE Rel-8 are periodic SRS, i.e. they follow a periodic pattern in time-domain. The subframes used for SRS transmission are semi-statically configured, like the bandwidth. A UE can be configured with multiple sounding bandwidths. SRS are transmitted in the last SC-FDMA symbol of a subframe configured for SRS transmissions. To avoid collisions with a PUSCH transmission from the same terminal PUSCH is always punctured, i.e., not transmitted in the last SC-FDMA symbol of a subframe configured for SRS transmission.

It may also be desirable to avoid collisions between SRS and PUSCH from different terminals since also this event deteriorates the eNB capability to decode PUSCH and extract channel status information from the SRS reception. Therefore each UE is aware of all subframes that can be used for SRS transmissions by any UE (given by the serving cell specific SRS subframe configuration) and punctures PUSCH in these subframes.

Figure 4:
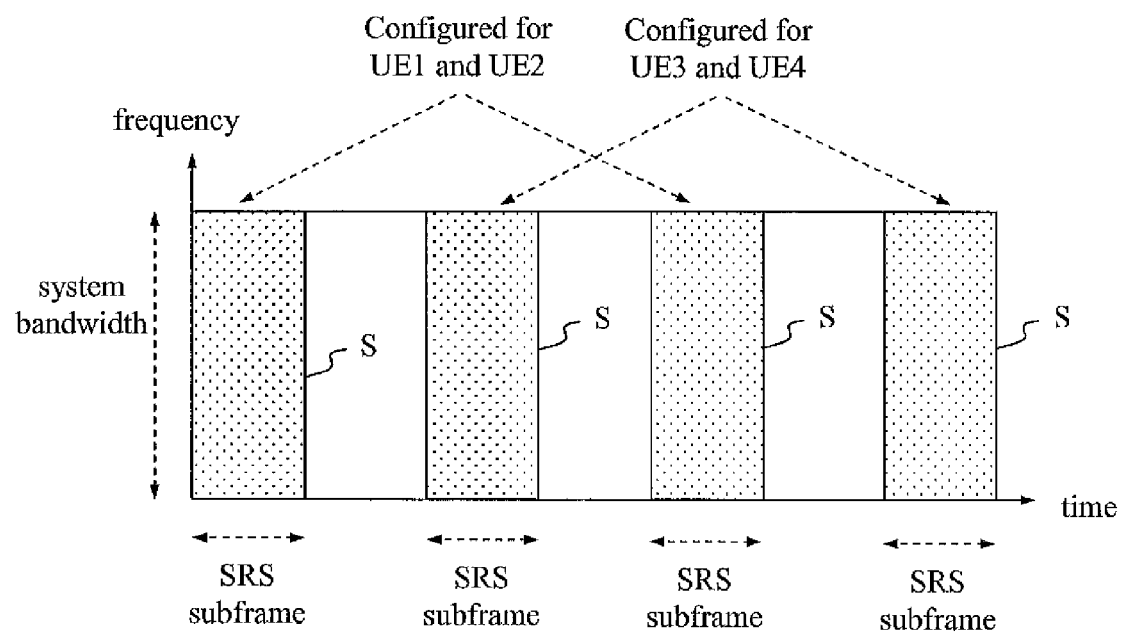
FIG. 4 is a schematic diagram illustrating serving cell specific and UE specific SRS configurations.

FIG. 4 shows a serving cell specific SRS subframe configuration and SRS configurations for some UEs denoted UE1-UE4. The serving cell specific SRS subframes are denoted S in this figure. No UE is allowed to transmit PUSCH in the last SC-FDMA symbol of serving cell specific SRS subframes.

In the frequency domain SRS can be of different bandwidth according to their semi-static configurations. SRS are transmitted on every second subcarrier within their bandwidth. SRS from different UEs can be transmitted in the same subframe using either 1) different frequency allocation 2) the other "every second subcarrier" or 3) a different orthogonal sequence if both UEs use the same subcarriers for their SRS.

Rel-10 also introduced a-periodic SRS. Unlike periodic SRS, a-periodic SRS are not always transmitted in an SRS subframe but only if it has been dynamically triggered.

SRS may also be used for uplink positioning measurements, e.g., to support UTDOA (e.g., Time of Arrival or Time Difference of Arrival Measurements) or E-CID (e.g., UE Rx-Tx or eNodeB Timing Advance measurements). For UTDOA, if SRS are not yet configured, a positioning node may request or indicate the need for configuring SRS to the serving node of the UE to be positioned. For E-CID, the measurements may be requested from eNodeB or UE. The SRS configuration of the UE to be used for positioning measurements is decided by the eNodeB.

Regarding interference coordination in heterogeneous networks (HetNets), the so far introduced HetNet solutions for LTE focus on the downlink. The need for enhanced ICIC techniques for downlink in such networks is particularly crucial when the cell assignment rule diverges from the RSRP-based approach, e.g. towards pathloss- or pathgain-based approach, sometimes also referred to as the cell range expansion when adopted for cells with a transmit power lower than in neighbor cells.

To facilitate measurements in the extended cell range, i.e., where high interference is expected, the standard specifies Almost Blank Subframe (ABS) patterns for eNodeBs and restricted measurement patterns for UEs. A pattern is a bit string indicating restricted and unrestricted subframes characterized by a length and periodicity, which are different for FDD and TDD (40 subframes for FDD and 20, 60 or 70 subframes for TDD).

Restricted measurement subframes are configured to allow the UE to perform measurements in subframes with improved interference conditions, which may be implemented by configuring ABS patterns at eNodeBs, and avoid measuring in high-interference conditions. Restricted measurement patterns are in general UE-specific. Three patterns are currently specified in the standard to enable restricted measurements:

Serving-cell pattern for RLM and RRM measurements;
Neighbor-cell pattern for RRM measurements;
Serving-cell pattern for CSI measurements.

ABS pattern is a transmission pattern at the radio node; it is cell-specific and may be different from the restricted measurement patterns signaled to the UE. In a general case, ABS are low-power and/or low-transmission activity subframes. ABS patterns may be exchanged between eNodeBs via X2, but these patterns are not signaled to the UE, unlike the restricted measurement patterns.

In LTE both satellite based positioning methods (e.g. A-GNSS such as A-GPS as specific example) and terrestrial or fall back positioning methods (e.g. OTDOA, E-CID, UTDOA etc) have been standardized for determining the location of the target device (e.g. UE).

The E-CID method relies on cell identity information, geographical location (coordinates) of the serving eNB and one or more additional UE and/or eNB measurements. The E-CID measurements which are relevant for the present discussion are:

eNodeB Rx-Tx time difference measurement.
UE Rx-Tx time difference measurement.
Timing Advance (TA). TA is derived from eNodeB Rx-Tx time difference measurement and/or UE Rx-Tx time difference measurement.
Angle of arrival (AoA) measured on signals received at the base station.

In UTDOA positioning method, several network radio nodes, such as LMUs, perform measurements on uplink signals transmitted by the target devices. An LMU is either located as a separate unit in an existing network or typically located at eNode B or BS or DeNB sites. The LMUs communicate with the positioning node (e.g. E-SMLC in LTE). The LMUs send measurements done on UE uplink signals to the positioning node which in turn determine the location of the target device.

In LTE positioning architecture, the three key network elements are the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves or in a network node. An LCS Client sends a request to LCS Server to obtain location information, and LCS Server processes and serves the received requests and sends the positioning result and optionally a velocity estimate to the LCS Client. A positioning request can be originated from the terminal or the network.

Position calculation can be conducted, for example, by a positioning server (e.g. E-SMLC or SLP in LTE) or UE. The former approach corresponds to the UE-assisted positioning mode, whilst the latter corresponds to the UE-based positioning mode.

Two positioning protocols operating via the radio network exist in 3GPP LTE, LPP and LPPa. The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between eNodeB and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g., currently OMA LPP extensions are being specified (LPPe) to allow, e.g., for operator- or manufacturer-specific assistance data or assistance data that cannot be provided with LPP or to support other position reporting formats or new positioning methods. LPPe may also be embedded into messages of other positioning protocol, which is not necessarily LPP.

However, the thus far introduced solutions for LTE focus on interference mitigation in the downlink, but do not address the above-described interference problems in the uplink.

In general in the uplink the aggressor UE which operates at higher output power may cause interference towards the victim neighboring nodes e.g. pico eNode B. The UE may operate using higher output power either being in the cell border region (compared to cell-center UEs) and/or transmitting high data rate.

The problem of high uplink interference is e.g. pronounced in the case of RSRP-based cell selection since here the selection is based on received power and not on pathloss. A UE might connect to a far-away macro eNodeB even though a pico eNodeB would be much closer because of the higher transmit power of the macro eNodeB. For two UEs with similar RSRP levels, e.g., a UE connected to a low-power node and a UE connected to a macro cell along the cell edge common for the two cells, the pathloss difference depends on the transmit power difference and may, e.g., be of up to 26 dB when the macro cell transmits at 46 dBm and a low-power node transmits at 20 dBm. Since the UE performs uplink power control which is typically based on the pathloss, the UE in a large cell may need to transmit with a high output power which can lead to substantial interference at the receiver of a nearby low-power victim radio node. For example, a UE connected to a macro cell associated with a macro radio node based on RSRP may be referred to as a "macro" UE at this point in time. The macro UE transmits an uplink signal to the macro radio node, which signal also causes interference on the uplink with respect to other transmissions intended to be received by a low power victim node, e.g. as illustrated in FIG. 1. Due to the low pathloss to the low power victim node, the macro UE can create a high level of interference toward the victim node. Another example is when one of the nodes operates a Closed Subscriber Group (CSG) cell, i.e., UEs in the coverage of such a cell cannot be served by this cell and thus have to transmit at a high power level to the serving cell while causing interference to the CSG cell.

The introduction of an offset for the Reference Signal Received Power (RSRP) based cell selection eases the problem since the pathloss for UEs along the cell edge become more balanced in neighbor cells associated with high-power and low-power nodes.

Completely balanced uplink interference would occur if cell selection would be pathloss-based. Pathloss-based cell selection can be emulated by providing an offset in the RSRP based cell selection that completely equalizes the power differences between macro and pico eNodeB. However, currently the largest possible offset value is 6 dB which cannot completely offset the higher macro eNodeB power. Another approach could be to use an additional offset for uplink power control, i.e., to increase the uplink transmit power of victim UEs served by low-power nodes, which is, however, not efficient from the power consumption point of view. However, the RSRP offsetting approach still cannot resolve the problem, due to possibly large RSRP measurement errors. The RSRP and in particular the absolute value of the RSRP of the target cell used for cell selection incorporates large measurement error. For example the worst case RSRP absolute inaccuracy is ±6 dB or even ±8 dB depending upon total received interference at the UE receiver under normal conditions. Due to the large RSRP measurement error, the UE may be connected to the macro eNode B while physically located closer to one or more pico eNode B. This may result in that the pico eNode B may receive higher interference from such a UE, even when the offset balances the transmit power difference.

New features have been introduced to enhance the uplink data rate. Examples of such features are uplink multi-antenna transmission, uplink carrier aggregation etc. For example the uplink spatial diversity techniques may be used to increase uplink data rate using directive transmission. However the beam direction is also prone to error. Thus any error in beam direction and particularly when the aggressor UE is in cell border region may cause significant interference towards the low power victim nodes e.g. pico eNode B.

Hence various scenarios in heterogeneous networks require techniques to mitigate, or at least minimize, the uplink interference towards the victim radio network node, e.g., pico eNode B, CSG based eNode B, etc. Embodiments described herein provide, for example, methods, devices, systems and software for solving/mitigating interference for various uplink channels and signals in heterogeneous network deployment, e.g.:

For PUSCH the proposed interference mitigation scheme of interference-protected resources is based on defining time-frequency regions that are exclusively used by UEs under high aggressor interference conditions in UL, e.g., UEs connected to low-power, i.e. victim, nodes.

Semi-statically configured PUCCH signaling poses no problem since interference-avoiding configurations of interference-protected resources can be applied in the cells. For dynamic hybrid-ARQ signaling on PUCCH a method is provided for mitigating interference.

For SRS, a method is described for defining configurations of interference-protected avoiding interference to a victim radio node, e.g., a pico eNodeB or radio measurement unit, from nearby UEs transmitting at high power while being connected to another cell, e.g., associated with a macro eNodeB.

Solutions described herein may also work for legacy UEs—i.e. pre-Rel-11 UEs, although further enhancements to signaling between UE and networks nodes are also proposed herein. However, the inter-node coordination by means of the uplink pattern may in some cases require Rel-10+ capabilities which are a part of a new signaling mechanism which is also described herein.

The techniques disclosed herein are described with a primary focus on heterogeneous deployments, which, however, shall neither be viewed as a limitation of possible embodiments, nor be limited to the 3GPP definition of heterogeneous network deployments. For example, the embodiments described herein could be adopted also for traditional macro deployments and/or networks operating more than one radio access technology (RAT).

The signaling described herein is either via direct links or logical links (e.g. via higher layer protocols and/or via one or more network nodes). For example signaling from a coordinating node may pass another network node, e.g., a radio node. Hence, the signaling described herein may be made, for example, via a radio interface or a fixed interface, and the solution is not limited in this respect.

Although the embodiments described herein address co-channel interference coordination in uplink by means of the uplink pattern of interference-protected resources are described for single-frequency networks, it will be appreciated that the embodiments may also be applied for multi-carrier and multi-frequency networks. In this case, the disclosed signaling means such as patterns may be additionally associated with a frequency or carrier and this information may also be signaled.

Although the description is given for UE, as a measuring unit, it should be understood by the skilled in the art that "UE" is a non-limiting term which means any wireless device or node (e.g. PDA, laptop, mobile, sensor, fixed relay, mobile relay or even a radio node equipped with UE interface such as femto base station).

A cell is associated with and served by a radio node, where a radio node, base station or eNodeB can be used interchangeably in this description. The radio node in this context may comprise, in a general sense, any node capable of transmitting and receiving radio signals used for measurements, e.g., an eNodeB, a macro/micro/pico base station, a home eNodeB, a relay, or a repeater. A micro eNode B is also interchangeably known as a "medium range eNode B". A radio node herein may further operate in one or more frequencies or frequency bands. It may be a radio node capable of CA. It may also be a single- or multi-RAT node which may e.g. support multi-standard radio (MSR) or may operate in a mixed mode.

A radio node may also be a node which does not create its own cell, but still receives uplink radio signals and performs uplink measurements, e.g., a measurement unit such as Location Measurement Unit (LMU) or a radio node sharing the cell ID with another radio node.

The terminology "low-power node" is used in this description to denote a node transmitting at a power level lower than that used for the so-called "wide area base station class" in the 3GPP standard, e.g., 46 dBm for macro nodes operating over 10 MHz bandwidth. Some non-limiting examples of lower-power nodes include home BS, pico BS, and micro BS. The home BS, pico BS and micro BS are interchangeably called as femto BS, local area BS and medium range BS, respectively.

The terminology "victim cell" or "victim node" or "victim UE" is herein associated with a node suffering from high interference in uplink. Some examples of "victim" nodes are a low-power node and CSG cell. In general, however, it may be any radio node or any UE whose measurements suffer from high interference in uplink. The terminology "aggressor cell" or "aggressor UE" herein relates to a cell or UE whose transmissions cause high interference in uplink. One example of aggressor cells is a macro cell. The radio node serving a macro cell is interchangeably called wide area base station or wide area eNode B or wide area donor node serving a relay node. In general, however, it may be any radio node or any UE whose transmissions cause high interference in uplink at another radio node. For example even micro base station (i.e. medium range base station or medium range donor base station etc) may also be an aggressor node. Similarly, UEs served by the medium range base station may also be aggressor UEs as they may cause high uplink interference towards low power node (e.g. pico base station).

The term "centralized network management node" or "coordinating node" used herein is a network node which may also be a radio network node which coordinates radio resources with one or more radio network nodes. Other examples of the coordinating node are network monitoring and configuration node, OSS node, O&M, MDT node, SON node, positioning node, a gateway node such as Packet Data Network Gateway (P-GW) or Serving Gateway (S-GW) network node or femto gateway node, etc.

The embodiments described herein are not limited to LTE, but may apply to any Radio Access Network (RAN), single- or multi-RAT. Some other RAT examples are LTE-Advanced, UMTS, GSM, cdma2000, WiMAX, and WiFi.

In FIG. 1 there has been illustrated a typical uplink high-interference scenario in which a UE connected to the macro radio node or eNodeB creates high interference at the pico eNodeB receiver. Since cell selection is based on RSRP the UE connects to the macro eNodeB and not to the pico eNodeB even though the latter is much closer and has lower pathloss to the UE. The UE may also connect to the relatively "weaker" eNode B (i.e. macro eNode B in this example) due to inherent measurement error in the RSRP measurement.

Because of uplink power control, the UE compensates for the pathloss and has thus a high output power if connected to the macro eNodeB. Since the pathloss to the pico eNodeB is lower than to the macro eNodeB the signal is received with high power at the pico eNodeB. If a cell-edge macro UE located close to pico eNode B and a pico UE share the same resources for uplink transmission, then these transmissions will be received with high interference at the pico eNodeB.

It should be noted that the scenario described in FIG. 1 is for illustrative purpose and thus the embodiments described herein are not limited to uplink macro-pico heterogeneous deployment. For example the embodiments are equally applicable to any other heterogeneous network deployment arrangement or any other aggressor-victim scenario in uplink. Other examples are macro eNode B—micro eNode B scenario, macro eNode B—Home eNB (CSG) scenario, etc.

In general, the embodiments described herein are applicable to any uplink heterogeneous network where an aggressor uplink network element (e.g. UE, target device, relay node (movable or fixed) etc) causes interference towards the uplink victim network element or node (e.g. pico eNode B, home eNode B, base station with restricted access, relay node, donor node serving relay, a measurement unit such as LMU, etc.).

A set of embodiments described below relates to interference mitigation schemes for PUSCH. PUSCH transmissions, as well as the corresponding uplink demodulation reference signals, are confined to the scheduled bandwidth in LTE systems. An uplink pattern in time-frequency of interference-protected resources that describes regions in time-frequency that can be exclusively used by the pico UEs (equivalently one can say not used by the macro UEs), can protect the resources in the pico cell from interference and create interference free reception for pico UEs. The protected frequency regions may be the same across subframes or can vary from subframe to subframe; even non-contiguous frequency regions can be envisioned. In the simplest case complete subframes extending across the entire system bandwidth are protected, i.e. not used by macro UEs. Examples for how such patterns can be configured in time and across a given system bandwidth are provided in FIGS. 5a and 5b.

Figure 5A:
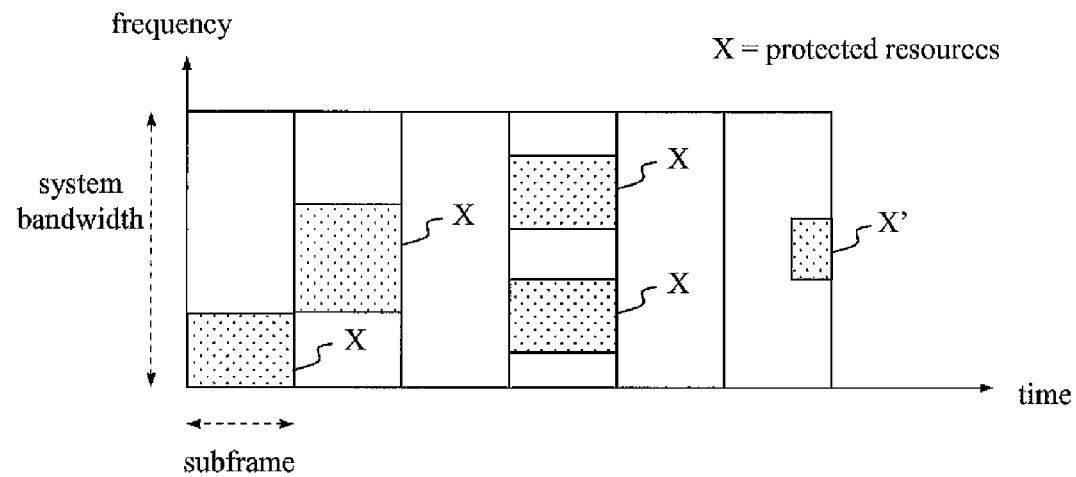
FIGS. 5a and 5b are schematic diagrams illustrating some examples of interference-protected resources, according to further possible embodiments.
Figure 5B:
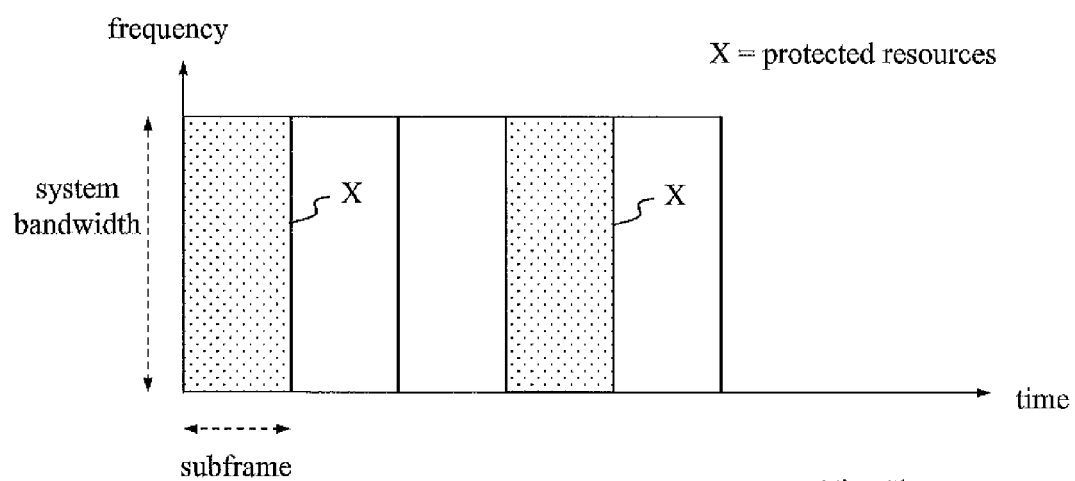

More specifically, FIG. 5a depicts interference-protected time-frequency regions, i.e. resources, X which are not used by macro UEs in the UL, while FIG. 5b shows a simplified version with interference-protected time-frequency regions or resources X across whole subframes which are not used by macro UEs in the uplink. In FIG. 5a, the interference-protected regions X extend across only parts of the system bandwidth, and even across only parts of a subframe, e.g. one or more SC-FDMA symbols in a subframe, as shown schematically by the region X' to the right.

If macro UEs apply frequency hopping or clustered uplink transmissions each frequency hop or cluster must not fall within the protected region. Uplink control signaling piggybacked on PUSCH fall also into this category. Since pico UEs—due to the low pathloss UE to pico eNodeB—are typically power-controlled to a low output power and do not create strong interference to the macro eNodeB receiver it is up to the pico eNodeB and pico UE if pico UEs are scheduled outside the protected region. However, signal reception in the pico eNodeB suffers from macro UE interference, the protection from which may be implemented with the above embodiments, e.g., as illustrated in FIGS. 5a and 5b.

Typically, such a pattern to mitigate interference on PUSCH in heterogeneous network would be periodic with a certain periodicity, e.g. 10 ms or 40 ms. The periodicity may also depend upon whether it is FDD or TDD, e.g., be a multiple of 10 ms for TDD and 8 ms for FDD to comply with HARQ roundtrip time. The periodicity may also depend upon the TDD sub frame and/or TDD special sub frame configurations. FIGS. 5a and 5b show possible examples of such patterns in time-frequency and in time domain only, respectively.

The purely time domain pattern may comprise a set of time instances (e.g. sub frames) which are not allowed or alternatively which are allowed for scheduling UE or a certain group of UEs in a cell e.g. in aggressor cell. The time-frequency domain pattern may comprise a set of resource blocks in certain sub frames which are not allowed or alternatively set of resource blocks in certain sub frames which are allowed for scheduling in the cell. Although the patterns are associated with subframes or certain time periods, there may be a rule by which the restriction applies to a pre-defined part of the indicated time period (e.g., one or more symbols of the indicated subframe) and/or the indicated frequency resources (e.g., one or more subcarriers).

The purely time-domain pattern may be expressed in terms of a bitmap. More specifically it may comprise a bit string of size N (where N=10, 40, 60, etc. is the periodicity). As an example, each bit 0 in the string may represent time duration (e.g. time slot, sub frame etc) where PUSCH transmission is not allowed in a cell. Similarly each bit 1 in the string may represent time duration (e.g. time slot, sub frame etc) where PUSCH transmission is allowed in a cell. The converse may also be used in that 0 and 1 may represent the time durations where PUSCH transmission is allowed and not allowed, respectively.

The time-frequency domain pattern may comprise two bit strings: one denoting the time domain aspect (e.g. partially non-allowed sub frames) and another one denoting the frequency domain aspect (e.g. non allowed resource blocks in partially non-allowed sub frames). For example the former and latter may be termed as sub frame bit string and resource block bit string patterns respectively. The resource block bit string may be the same for all sub frames or for group of sub frames or may be different for different sub frames. The size of resource block bit string also depends upon the channel/transmission bandwidth. Other—more compact—schemes to signal the frequency allocation can be envisioned as well (which comment also applies to other embodiments described below).

The uplink interference mitigation pattern is associated with a starting reference time ($T_{UL\_pattern}$). The reference time may be linked to a well known parameter such as SFN of a cell e.g. pre-defined SFN value=0 or mod(SFN,N1)=N2 where N1 and N2 are some integer numbers such as N1 is a pattern length and N2 is an offset. Typically the pattern may start from the beginning of the frame (e.g. frame with SFN=0) or from any specific pre-defined sub frame (e.g. sub frame #5) or from a configured sub frame. The reference time for indicating the starting of the uplink pattern may also be linked to the reference time of a downlink pattern (e.g. ABS pattern used for downlink inter-cell interference mitigation also known as downlink "eICIC") by a suitable relation. In this case a relation between the start of the uplink and downlink reference timings corresponding to uplink pattern and downlink pattern respectively can be pre-defined. Examples of such relations are:

$$T_{UL\_pattern} = f(T_{DL\_pattern}, \Delta)$$

As a specific example:

$$T_{UL\_pattern} = (T_{DL\_pattern} - \Delta),$$

where $\Delta$ in the above expression can be positive or negative quantity. It can be expressed in terms of number of sub frames or any other relevant time period (e.g. time slot). This can be even pre-defined (e.g. 6 subframes) or can be configured at the eNode B or by another node (e.g. O&M, OSS, another eNode B etc).

In another embodiment, the relation of uplink and downlink patterns may also be indicated by an indicator. In one example, the indicator may indicate that the downlink and uplink patterns have "the same" or "different" one or all pattern configuration parameters (e.g., bit string, periodicity, length, etc.).

In another embodiment, a set of uplink pattern configurations may have been pre-defined, with each of the uplink pattern configurations in the set defined by a unique configuration index.

In yet another embodiment, at least some pattern configuration parameters (e.g., reference time, bit string, etc.) may depend on the cell ID.

The patterns may be transmit patterns, i.e., related to restricting transmissions, but may also be measurement patterns or receive patterns. A transmit pattern would typically describe transmissions in one cell, whilst a measurement pattern indicates when measurements are to be performed and the patterns may be defined for measurements of one or more cells.

A measurement pattern is used for performing uplink, downlink or combined uplink/downlink measurements by a UE or a radio node. For example, the UE performs measurements on a downlink signal. The radio node performs measurements on signals transmitted by the UE according to uplink measurement pattern. An example of a combined measurement is Rx-Tx measurement which comprises measuring on downlink and uplink signals. A measurement pattern defined for a measuring node would typically indicate a subset of time and/or frequency resources on which the measured signal is to be measured. The patterns for interference mitigation in this section have so far been described as transmit patterns; however, the embodiments herein may be adapted in a straightforward way to describe measurement patterns or receive patterns.

A receive pattern is in some sense similar to the measurement pattern, but it applies to for receiving the information via radio interface rather than performing measurements on signals/channels. It is known that e.g. for diversity, the same information may be transmitted to/received at multiple receive points. When multiple receive points are used, the information may be combined where the combing may be such that the same information is received simultaneously by the multiple receive points or interchangeably in time and/or frequency. Given that different receive points may experience different interference conditions e.g. at different time, the intention with the receive pattern is to indicate when and on which time/frequency resources a receive point comprised in the set of receive points shall receive the information for further combining the information from more than one receive points. Such coordination allows to control interference and also the amount of information redundancy among the receive points (which may be useful when the delivery is not reliable e.g. due to interference conditions or may be not necessary otherwise). The receive pattern may be implemented by means of scheduling or assigning different codes for the time/frequency resource indicated by the pattern. Except for a general heterogeneous deployment, some specific deployment examples using the receive patterns are the deployments with CoMP, relays or repeaters.

Any of the above transmit, measurement and receive patterns may be associated with Cell ID.

The victim cell allocates its UEs on all or at least a subset of PUSCH resources which overlap with the unused or partially used resources in the configured interference mitigation pattern in the aggressor cell. The victim cell can therefore gather information about the actual usage of the resources i.e. allocated to the UEs. The resource utilization information may also comprise of one or more bit strings where 0 and 1 may indicate used and unused time or time-frequency resources respectively. The percentage of resource block usage in time instances (e.g. in sub frames) can also be collected. The time duration over which the resource utilization information is gathered can also be collected.

The described resource utilization may be defined for any of transmit pattern, receive pattern or a measurement pattern, e.g., there may be defined a fraction of the time and/or frequency resources that are actually used for measurements and/or uplink communication out of all resources indicated by any of these patterns for transmitting/receiving/measurement, respectively.

The information associated with the interference mitigation pattern (at least one of transmit pattern used in the aggressor cell and receive or measurement pattern used in the victim cell and the resource utilization information is signaled between network nodes and between network or radio nodes and UEs. This is described below.

Considering signaling between network nodes, and in one embodiment, the signaling is exchanged between aggressor cell (e.g. macro eNode B serving aggressor UEs) and victim cell (e.g. pico eNode B) to indicate the configured interference mitigation patterns i.e. time and/or time-frequency resources not used by aggressor UEs. The parameters associated with the pattern configured in the aggressor cell are provided by the aggressor cell to the victim cell over X2 interface. For example, one or more parameters described above can be exchanged between the eNBs over X2. The signaling of such information can be done periodically or triggered based on request from the victim cell or by another node.

The victim cell may also signal the information about the utilization of pattern to other network nodes. For example the victim cell (e.g. pico eNB) can send one or more pieces of information to the aggressor cell (e.g. macro eNB) over X2 interface. The receiving network node may use the acquired information to modify the interference mitigation pattern. For example if the resource utilization in the victim cell is high then the aggressor cell may modify the pattern by increasing the set of unused resources. On the other hand if the resource utilization in the victim cell is low (e.g. below certain threshold) then the aggressor cell may decrease the set of unused resources.

In another embodiment, the pattern-related information (transmit/receive/measurement pattern) is signaled by a network node to a radio node (e.g., eNodeB in active or dormant state or LMU) via radio and/or cable connections. The radio node is not necessarily the victim radio node but the one that receives signals of the victim radio node. The network node may be another radio network node or a core network node.

In yet another embodiment, the above stated information can also be signaled by/to the radio node to/by a centralized network management node. The centralized network management node may use the acquired information to improve network planning, configuration and tuning of parameters etc. In another embodiment, the patterns may be created by the centralized node.

Considering signaling over the radio interface, the serving network node may allocate the resources to UEs under its control for the uplink transmission on PUSCH by using the existing signaling and resource assignment principle. The serving node may also signal the information about the configured interference mitigation pattern (e.g., an uplink transmit pattern in aggressor cell(s)) to the UEs. The victim serving node may even signal the information about the resource utilization associated with a pattern in a cell to the UEs.

Considering signaling involving a positioning node, according to this embodiment the positioning node (e.g. E-SMLC) may receive or acquire the information associated with the interference mitigation pattern configured in a cell (e.g. aggressor macro eNB) from at least one of:
- Radio network node (i.e. eNB or measurement unit)
- network node (e.g. core network node, O&M, OSS, network configuration node, MDT, SON etc)
- UE According to this embodiment the positioning node (e.g. E-SMLC) may also receive or acquire the information associated with the utilization of resources associated with the pattern in a cell (e.g. victim pico eNB) from at least one of:
- Radio network node (i.e. eNB or measurement unit)
- network node (e.g. core network node, O&M, OSS, network configuration node, MDT, SON etc)
- UE The positioning node may use the above information when configuring one or more UE and/or eNode B positioning measurements. Examples of UE and eNB positioning measurements are UE Rx-Tx time difference measurement and eNode B Rx-Tx time difference measurement, respectively. Such measurements may rely on signals transmitted on PUSCH and thus the allocated PUSCH resources will affect the positioning performance.

In another embodiment, the uplink transmission or measurement pattern related to mitigating the interference from the aggressor cell may be communicated by the positioning node to another radio network, e.g., LMU or eNodeB. This information may be used, e.g., to indicate low-interference measurement occasions of other (non-aggressor) signals. In yet another embodiment, receive/measurement patterns may be created by the positioning node.

The foregoing embodiments relate to, but are not necessarily limited to, techniques for mitigating uplink interference on the PUSCH. Consider now some embodiments which can be used to mitigate uplink interference on, for example, the PUCCH. PUCCH signaling can be categorized into semi-statically configured signaling and dynamic signaling. Semi-static signaling includes periodic CSI reporting, scheduling request, and semi-statically configured hybrid-ARQ resources. To avoid interference from semi-statically configured PUCCH Format 1 and Format 2 the resources are allocated in different (i.e. non-overlapping) resource blocks for UEs in aggressor cell (e.g. macro eNB) and UEs in a victim cell (e.g. pico eNB).

Dynamic hybrid-ARQ resources are not semi-statically configured but derived from the downlink control channel PDCCH that has been used to schedule the corresponding downlink transmission. Since these resources are dynamically assigned it is unreasonable to assume that these resources can always be exchanged via X2.

Figure 6:
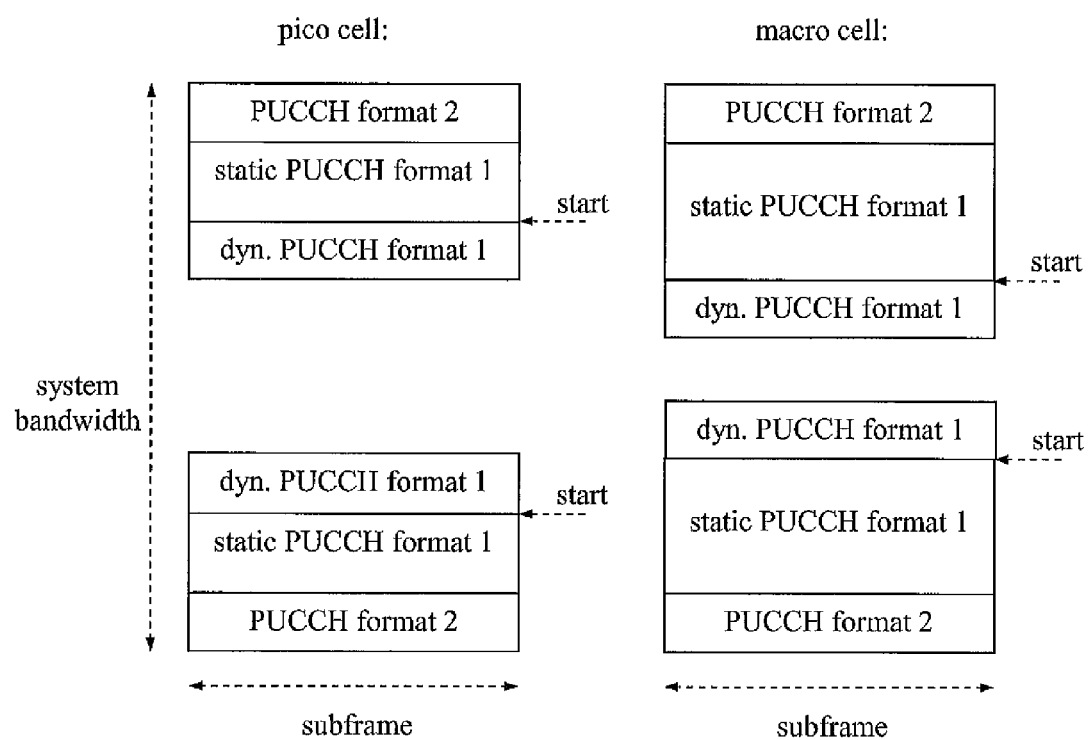
FIG. 6 is a schematic diagram illustrating how PUCCH resources can be interference-protected, according to further possible embodiments.

For PUCCH Format 1a/1b the starting resource block of the first dynamic hybrid-ARQ resource can be derived from semi-statically configured parameters; subsequent dynamic hybrid-ARQ resources grow inwards. FIG. 6 shows the dynamic PUCCH Format 1 region for two different sets of PUCCH configurations used in macro and pico cells, respectively. Therein, the starting resource blocks of the dynamic PUCCH Format 1 regions in macro and pico cells, as indicated by the dashed arrows denoted "start", are different due to different PUCCH configurations. Higher dynamic PUCCH indices are transmitted on more inner resource blocks, i.e. the dynamic PUCCH Format 1 region will not grow outwards. In this example dynamic PUCCH Format 1 region of the macro cell is located more inwards. The outer dynamic PUCCH Format 1 region (left side of FIG. 6) can theoretically grow into the inner dynamic PUCCH Format 1 region (right side of FIG. 6); however, with proper dimensioning this situation can be avoided. The starting resource block for dynamic PUCCH Format 1 is determined by the parameters $N_{RB}^{(2)}$, $N_{cs}^{(1)}$, $N_{PUCCH}^{(1)}$, and $\Delta_{shift}^{PUCCH}$ as explained above.

PUCCH Format 3 resources used to feedback SCell or carrier aggregation hybrid-ARQ bits are semi-statically configured and the PDCCH only selects one of the semi-statically configured resources. By configuring different PUCCH Format 3 resources for macro and pico UEs—which are mapped onto different resource blocks—interference can be avoided. PUCCH Format 3 resources are configured with the parameter list $n_{PUCCH}^{(3,p)}$.

Further, an offset (e.g. in frequency) may be configured between the semi-statically configured region and the dynamically configured region and the offset may be different in the aggressor cell and victim cell.

The parameters associated with the interference mitigation pattern for PUCCH according to embodiments could include, but are not limited to, e.g., deltaPUCCH-Shift ($\Delta_{shift}^{PUCCH}$), nRB-CQI ($N_{RB}^{(2)}$), nCS-An ($N_{cs}^{(1)}$), n1Pucch-AN ($N_{PUCCH}^{(1)}$), ackNackRepetition, repetitionFactor ($N_{ANRep}$), n1Pucch-AN-Rep, n1 PUCCH-AN-RepP1 ($n_{PUCCH, ANRep}^{(1,p)}$), tdd-AckNackFeedbackMode, n1PUCCH-AN-CS-List, n3PUCCH-AN-List, n3PUCCH-AN-ListP1($n_{PUCCH}^{(3,p)}$), pucch-Format, twoAntennaPort-ActivatedPUCCH-Format1a1b, an additional offset for configuring a shift in frequency for certain formats between an aggressor cell and a victim cell (e.g., as illustrated for the macro and pico cells, respectively, in FIG. 6), either individually or in any combination.

In addition there can be a reference time to indicate the start of the uplink interference mitigation pattern for PUCCH. Like for PUSCH (as described above), the reference time may be linked to a well known parameter such as SFN of a cell e.g. pre-defined SFN value=0. Hence principles related to reference timing described for PUSCH above also apply for PUCCH. Typically PUCCH and PUSCH may have the same reference timing. However separate reference timing may also be used for PUSCH and PUCCH transmissions. Moreover, any of transmit pattern, receive pattern and measurement patterns described above for PUSCH may be defined and used for PUCCH.

The victim cell may also utilize a subset of PUCCH resources which overlap with the unused or partially used PUCCH resources in the aggressor cell. The victim cell therefore gathers information about the actual usage of the PUCCH resources allocated to the UEs. The PUCCH resource utilization information may comprise the PUCCH resource utilization in time domain (e.g. sub frames etc) and/or frequency domain (e.g. sub carriers, resource blocks etc). The utilization may further be expressed as the percentage of resource block usage in time instances (e.g. in sub frames). Typically the resource utilization information is obtained for each time instance e.g. sub frame. However the resource utilization information can also be obtained over a longer duration e.g. average over one or more frames.

The described resource utilization may be defined for any of transmit pattern, receive pattern or measurement pattern, e.g., there may be defined a fraction of the time and/or frequency resources that are actually used for measurements and/or uplink communication out of all resources indicated by any of these patterns for transmitting/receiving/measurement, respectively.

The information described above and associated with the PUCCH interference mitigation pattern (at least one of transmit pattern used in the aggressor and receive or measurement pattern used at the victim) and the PUCCH resource utilization information is signaled between network nodes and between network nodes and UEs. This is described below.

For example, considering signaling between network nodes and in one embodiment, for PUCCH interference mitigation, X2 interface supports signaling of PUCCH configuration parameters associated with the interference mitigation pattern to enable coordination of neighboring eNodeBs. This enables the victim eNB to allocate the PUCCH resources which don't collide or partially collide with the resources used in the aggressor cell.

Similarly the parameters depicting the PUCCH resource utilization in the victim cell may also be exchanged between the eNBs e.g. between pico eNode B and macro eNode B. This enables the aggressor eNode B to modify the PUCCH interference mitigation pattern. For example depending upon the PUCCH resource utilization in the victim cell, the aggressor cell may increase or decrease the unused or partially used PUCCH resources in the aggressor cell.

In another embodiment, the pattern-related information (transmit/receive/measurement pattern) is signaled by a network node to a radio node (e.g., eNodeB in active or dormant state or LMU) via radio and/or cable connections. The radio node is not necessarily the victim radio node but the one that receives signals of the victim radio node. The network node may be another radio network node or a core network node.

In yet another embodiment, the above stated parameters for PUCCH described above may also be signaled by/to the radio node to/by a centralized network management node. The centralized network management node may use the acquired information to improve network planning, configuration and tuning of parameters etc. In another embodiment, the patterns may be created by the centralized node.

Considering signaling over the radio interface, the serving network node may assign the PUCCH resources to UEs under its control for transmission of uplink control information by using the existing signaling and resource assignment principle. The serving node (e.g. macro or pico eNB) may however also signal the information about the PUCCH interference mitigation pattern (e.g., an uplink transmit pattern configured in aggressor cell(s)) to the UEs. The victim serving node (e.g. pico eNode B) may even signal the information about the PUCCH resource utilization associated with a pattern in a cell to the UEs.

Considering signaling involving a positioning node, and according to one aspect of this embodiment, the positioning node (e.g. E-SMLC) may receive or acquire the information associated with the PUCCH interference mitigation pattern configured in a cell (e.g. aggressor macro eNB) from at least one of:
  Radio network node (i.e. eNB or measurement unit)
  network node (e.g. core network node, O&M, OSS, network configuration node, MDT, SON etc)
  UE According to another aspect of this embodiment the positioning node (e.g. E-SMLC) may also receive or acquire the information associated with the utilization of PUCCH resources associated with the pattern in a cell (e.g. victim pico eNB) from at least one of:
  Radio network node (i.e. eNB or measurement unit)
  network node (e.g. core network node, O&M, OSS, network configuration node, MDT, SON etc)
  UE The positioning node may use the above information when configuring one or more UE and/or eNode B positioning measurements. For example, the UE Rx-Tx time difference measurement, eNode B Rx-Tx time difference measurement and Timing Advance measurement or other positioning measurements may rely on signals transmitted on PUCCH and thus the allocated PUCCH resources will affect the positioning performance.

In another embodiment, the uplink transmission or receive or measurement pattern related to mitigating the interference from the aggressor may be communicated by the positioning node to another radio network, e.g., LMU or eNodeB. This information may be used, e.g., to indicate low-interference measurement occasions of other (non-aggressor) signals. In yet another embodiment, receive/measurement patterns may be created by the positioning node.

Having discussed exemplary uplink interference mitigation techniques associated with PUSCH and PUCCH, the discussion now turns to mitigating interference associated with Sounding Reference Signals (SRS). SRS subframes (or more precisely the subframes where the last SC-FDMA symbol is used for SRS transmissions) from pico UEs can be protected from macro UE interference by not transmitting anything, including e.g. SRS, PUSCH or PUCCH, at the corresponding time-frequency resources by macro UEs.

Figure 7:
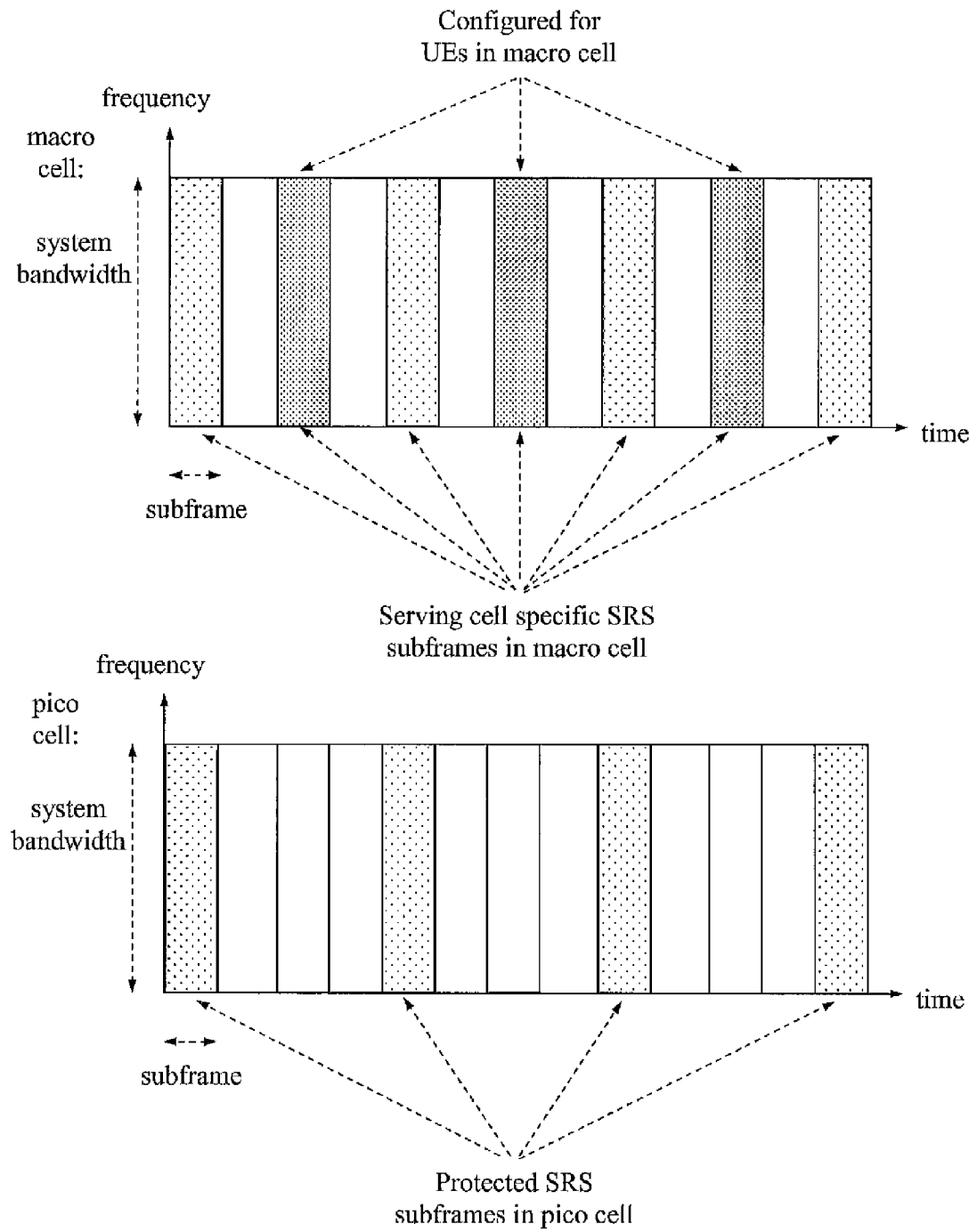
FIG. 7 is a schematic diagram illustrating serving cell specific SRS subframes in a macro cell and interference-protected SRS subframes that can be used in a pico cell, according to further possible embodiments.

This can be achieved by, for example, configuring serving cell specific SRS subframes in the macro cell that includes all protected SRS subframes used by pico UEs (and potentially additional SRS subframes), see an example illustrated in FIG. 7 wherein serving cell specific SRS subframes in a macro cell are configured to protect SRS subframes used by UEs in a pico cell from interference. Thus, no UE in the macro cell however is configured with SRS transmissions in those subframes that overlap with protected SRS subframes used by any UE in the pico cell. Macro cell UEs can be configured with SRS in those serving cell specific SRS subframes not protected for pico cell UEs.

The serving cell specific SRS subframes in the pico cell are now at least those subframes protected from macro cell interference. Pico UEs are then configured with a subset or all subframes of the serving cell specific SRS subframes.

Since pico cell UEs do not create high interference at the macro eNB receiver pico UEs could even use SRS subframes not protected by the macro cell without disturbing macro cell operation. However, the SRS reception at the pico eNB receiver or LMU will suffer from high interference without the scheme described in this embodiment.

Since SRS bandwidths are configurable, therefore another possibility is to separate SRS transmissions of macro and pico UEs in the frequency domain. For example, macro UE SRS transmissions can be confined to the same bandwidth as PUSCH as described above. In another example, SRS of aggressor UEs may be configured on subcarriers that do not overlap with SRS of victim UEs, given that in the frequency domain SRS for some UEs may be transmitted on every second subcarrier and for the other UEs on the other every second subcarrier within their SRS bandwidth, as described in Section 1.1.1.3. The aggressor UEs may be identified by exploiting the fact that power-controlled UEs transmit at a higher power level closer to the cell edge. For example, a UE may be determined as an aggressor if the estimated distance to the serving node is above a threshold. The estimated distance may e.g. be one of or obtained based on at least one of: a timing measurement or a signal strength measurement.

If macro UEs have PUCCH transmissions ongoing in those subframes where pico UE SRS transmissions are protected PUCCH must use the shortened PUCCH format, i.e. the last SC-FDMA symbol of PUCCH is punctured. In LTE this can be configured with the parameter "ackNack-SRS-SimultaneousTransmission".

Subframes used by macro UEs for SRS transmission will cause high interference levels in the corresponding subframes at the victim eNode B (e.g. pico eNB) receiver. If those subframes are used by macro UEs only for SRS but not for PUSCH transmission then the high interference is limited to the last SC-FDMA of the subframe. Then the sub frame can therefore be used by pico UEs for PUSCH and PUCCH transmissions. Performance can be improved if the pico eNB receiver is aware that in some subframes the last SC-FDMA symbol is highly interfered. For example, the PUSCH receiver could ignore (set to zero) all soft values (soft bits) corresponding to bits transmitted in the last SC-FDMA symbol.

It should be understood that location measurement units or similar devices which may be used for positioning, e.g., UTDOA, may be not necessarily co-located with eNodeB. Therefore eNodeB denoting macro UE transmissions as aggressing interference and pico UEs as victims is for the illustration purpose only. In practice, with uplink positioning, a victim may be a UE from any cell whose transmission is relatively weak and an aggressor may be any UE whose detected signal at the measurement unit is relatively strong. So, an aggressor cell may be any cell, e.g. macro, neighboring pico, femto, etc. And a victim cell may also be any cell being measured, e.g., macro, neighboring pico, femto, etc., and a victim cell may be not co-located with the measuring node for some positioning measurements.

Considering the parameter(s) which can be used to characterize an SRS interference mitigation pattern according embodiments, for SRS patterns in the time domain of the aggressor eNode B (e.g. macro eNode B), the associated parameters comprise of the subframes whose last SC-FDMA symbols are not used by the aggressor UE (e.g. macro UEs). Also the information which subframes are actually used by macro UEs for SRS transmission can be useful to improve PUSCH and PUCCH reception in the victim cell (e.g. pico cell).

If the pattern coordinates SRS transmissions in the frequency domain then the SRS pattern information is characterized by at least the SRS bandwidth and frequency position of the SRS.

If macro UEs do not transmit any SRS in subframes or in frequency regions of subframes where PUSCH in the victim cell (e.g. pico cell) is protected, as described above, then potentially no extra parameter or associated signaling is required for SRS.

More than one SRS pattern may be available. In that case a separate identifier can be used to indicate the type of SRS pattern configured in a cell e.g. identifiers for time-domain only, frequency domain or combination thereof etc.

Similar to PUSCH and PUCCH patterns, the SRS interference mitigation pattern is also characterize with the starting reference time e.g. SFN which may be pre-defined or configurable. The SRS pattern may also typically be periodic. Therefore similar to PUSCH and PUCCH patterns, the SRS pattern can also be expressed in terms of one or more bit strings of certain size N. The reference time may also be the same for SRS and for other patterns (i.e. PUCCH and PUSCH).

As described in for the PUSCH embodiments above, receive/measurement patterns may also be defined and this also applies for SRS.

The victim cell may not utilize all possible SRS resources which overlap with the unused or partially used SRS resources in the aggressor cell. The SRS are typically configured to facilitate frequency domain scheduling, certain uplink MIMO transmissions, positioning measurements etc. Hence depending upon the network features in use, the SRS configuration in a cell may vary in time and/or in frequency domain. Similar to PUCCH or PUSCH utilization, the SRS usage can be obtained by the victim cell. The principles for expressing the SRS utilization in a victim cell are the same as described for PUCCH and PUSCH.

The described resource utilization may be defined for any of transmit pattern, receive pattern or a measurement pattern, e.g., there may be defined a fraction of the time and/or frequency resources that are actually used for measurements and/or uplink communication out of all resources indicated by any of these patterns for transmitting/receiving/measurement, respectively.

The information associated with the SRS interference mitigation pattern (at least one of transmit pattern used in the aggressor and receive or measurement pattern used at the victim, as described above) and the SRS resource utilization information (as described above) is signaled between network nodes and between network nodes and UEs. These signaling aspects are described below.

Considering signaling between network nodes and in one embodiment, SRS interference mitigation pattern information (i.e. one or more of the associated SRS interference parameter(s) described above) is exchanged between eNode Bs over the X2 interface. This enables the victim eNode B to be aware of the SRS used and unused in the aggressor cell. Hence the victim eNode B can allocate the SRS resources which don't collide or partially collide with the corresponding SRS resources used in the aggressor cell.

Also the information related to the utilization of the SRS resources in the victim cell may also be exchanged between the radio nodes e.g. between pico eNode B and macro eNode B. This enables the aggressor node to modify the SRS interference mitigation pattern. For example depending upon the utilization of the SRS in the victim cell, the aggressor cell may increase or decrease the unused or partially used SRS resources in the aggressor cell.

In another embodiment, the pattern-related information (transmit/receive/measurement pattern) is signaled by a network node to a radio node (e.g., eNodeB in active or dormant state or LMU) via radio and/or cable connections. The radio node is not necessarily the victim radio node but the one that receives signals of the victim radio node. The network node may be another radio network node or a core network node.

The above stated parameters may also be signaled by/to the radio node to/by a centralized network management node. The centralized network management node may use the acquired information to improve network planning, configuration and tuning of parameters etc. In another embodiment, the patterns may be created by the centralized node.

Regarding signaling over the radio (air) interface, the serving network node may assign the SRS resources to UEs under its control for SRS transmission in the uplink by using the existing signaling and resource assignment principles. The serving node (e.g. macro or pico eNB) may however also signal the information about the SRS interference mitigation pattern (e.g., an uplink transmit pattern configured in aggressor cell(s)) to the UEs. The victim serving node (e.g. pico eNode B) may even signal the information about the utilization of the SRS resources in a cell to the UEs.

Regarding signaling involving a positioning node, and according to one aspect of this embodiment, the positioning node (e.g. E-SMLC) may receive or acquire the information associated with the SRS interference mitigation pattern configured in a cell (e.g. aggressor macro eNB) from at least one of:
Radio network node (i.e. eNB or measurement unit)
network node (e.g. core network node, O&M, OSS, network configuration node, MDT, SON etc)
UE According to another aspect of this embodiment, the positioning node (e.g. E-SMLC) may also receive or acquire the information associated with the utilization of SRS resources associated with the pattern in a cell (e.g. victim pico eNB) from at least one of:
Radio network node (i.e. eNB or measurement unit)
network node (e.g. core network node, O&M, OSS, network configuration node, MDT, SON etc)
UE The positioning node may use the above information when configuring one or more UE and/or eNode B positioning measurements. Several types of positioning measurements rely on SRS transmissions. For example the UTDOA measurements done at LMU, E-CID measurements (e.g. UE Rx-Tx time difference measurement, eNode B Rx-Tx time difference measurement) or other positioning measurements generally rely on SRS transmissions by the UE whose location is determined. Thus the allocated SRS resource may heavily affect the positioning performance in several positioning methods.

In another embodiment, the uplink transmission or measurement pattern related to mitigating the interference from the aggressor may be communicated by the positioning node to another radio network, e.g., LMU or eNodeB. This information may be used, e.g., to indicate low-interference measurement occasions of other (non-aggressor) signals. In yet another embodiment, receive/measurement patterns may be created by the positioning node.

Regarding uplink interference mitigation signaling in general for any or all of PUSCH, PUCCH and/or SRS, pattern (e.g., transmit, receive or measurement) information for at least one neighbor cell may be provided to a node or UE by signaling a configuration index or a parameter from which the pattern may be reconstructed at the intended node. The parameter may be cell ID (e.g., of the aggressor cell).

Moreover, instead of signaling individual patterns for PUSCH, PUCCH, SRS which subframes or frequency regions of subframes are protected it can be sufficient just to signal the subframes or frequency regions of subframes which are protected. For example, if the macro eNB ensures that macro UEs neither transmit PUSCH, PUCCH nor SRS in the marked regions in FIG. 5a or FIG. 5b, it is sufficient to transmit just this aggregate pattern. The aggregate patterns may also be defined for any combination of PUSCH, PUCCH and SRS or other uplink channels and/or signals.

Similar to the patterns individual for specific uplink channels or signals, the aggregate patterns (i.e., common for more than one channels and/or signal types) may also be cell-specific or UE-specific. Further, the aggregate patterns may also be transmit patterns, receive or measurement patterns. In yet another embodiment, receive and measurement patterns may be the same for at least some nodes (which may also be a UE). In yet another embodiment, a transmit pattern and at least one of receive or transmit pattern are the same for at least some nodes (which may also be a UE).

Among other advantages, the embodiments enable creation of interference-protected uplink resources, e.g. in the form of subframes or other fractions of time and/or frequency, which can be for communications and measurements of victim cell transmissions, which improves signal reception by the victim radio node in the victim cell. This in turn may lead to higher capacity, more reliable communication and improved measurement quality in the victim cell.

Figure 8:
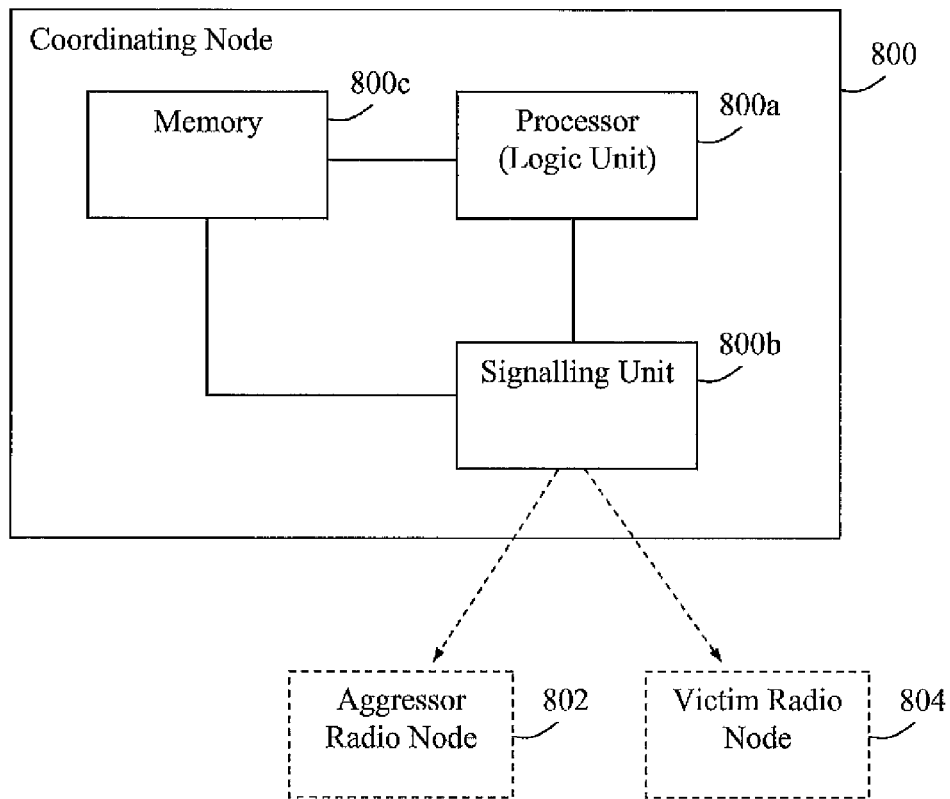
FIG. 8 is a block diagram illustrating a coordinating node in more detail when signaling an uplink pattern, according to further possible embodiments.

A more detailed but non-limiting example of how a coordinating node can be configured to accomplish the above-described embodiments of this solution, is illustrated by the block diagram in FIG. 8. The coordinating node 800 is configured to coordinate uplink transmissions in a victim cell and in an aggressor cell, e.g. according to the examples described above for any of FIGS. 2-7, respectively. It is assumed that low output power is required for the uplink transmissions in the victim cell and high output power is required for the uplink transmissions in the aggressor cell.

The coordinating node 800 comprises a logic unit 800a, here implemented as a "processor" or the like, which is adapted to obtain an indication of an uplink pattern of interference-protected resources in frequency and time where uplink transmissions are allowed to be scheduled in the victim cell but not in the aggressor cell. The coordinating node 800 also comprises a signaling unit 800b adapted to signal the indication of the uplink pattern to at least one of an aggressor radio node 802 serving the aggressor cell and a victim radio node 804 serving the victim cell. Thereby, the coordinating node 800 enables mitigation of interference caused by uplink transmissions in the aggressor cell when receiving uplink signals on the interference-protected resources at the victim radio node.

The above logic unit 800a and signaling unit 800b may also be adapted to accomplish any of the above-described optional embodiments and features, e.g. as illustrated in any of the FIGS. 2-7. Further, the features of the logic unit 800a and the signaling unit 800b may be controlled by a computer program installed in a memory 800c, the computer program being loadable into the processor/logic unit 800a. As in the examples depicted in FIGS. 3a-c, the coordinating node 800 may be located and implemented at the aggressor radio node 802, or at the victim radio node 804, or at a third network node apart from the aggressor and victim radio nodes 802, 804.

Figure 9:
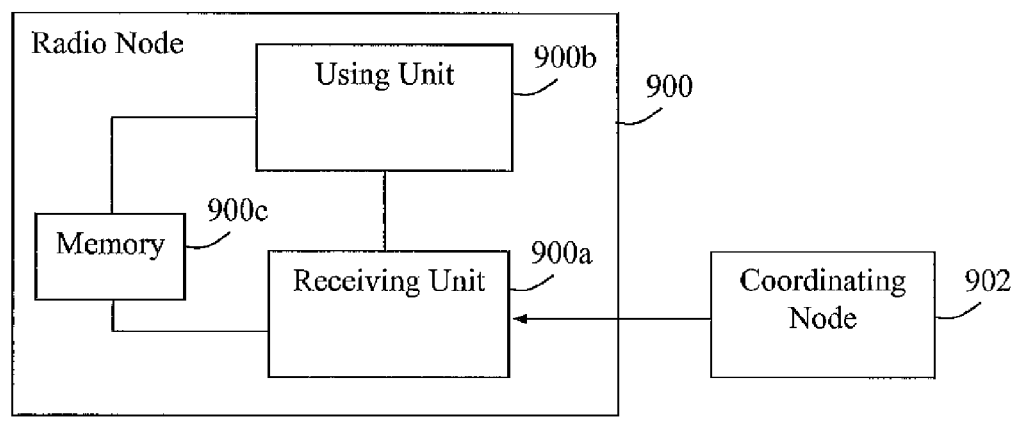
FIG. 9 is a block diagram illustrating a radio node which receives and uses an indication of uplink pattern, according to further possible embodiments.

A radio node of a wireless communication network, which node receives and uses the above-described pattern indication from the coordinating node, will now be described with reference to the block diagram in FIG. 9. The radio node 900 is configured to schedule or configure for uplink transmissions in one or both of a victim cell and in an aggressor cell, wherein the uplink transmissions in the aggressor cell potentially cause interference at a victim radio node receiving or measuring uplink signals transmitted in the victim cell. Further, the radio node 900 may be the aggressor radio node 802 or the victim radio node 804 in the example of FIG. 8.

The radio node 900 comprises a receiving unit 900a adapted to receive, from the coordinating node 902, an indication of an uplink pattern of interference-protected resources in one or both of frequency and time where uplink transmissions are allowed to be scheduled in the victim cell but not in the aggressor cell. The radio node 900 also comprises a using unit 900b adapted to use the uplink pattern for scheduling uplink transmissions in one or both of the victim cell and the aggressor cell, or for configuring at least one measurement or signal reception according to the uplink pattern. Further, the features of the receiving unit 900a and the using unit 900b may be controlled by a computer program installed in a memory 900c, the computer program being loadable into a processor, not shown.

While the solution has been described with reference to specific exemplary embodiments, the description is generally only intended to illustrate the inventive concept and should not be taken as limiting the scope of the solution. For example, the terms "coordinating node", "aggressor cell", "victim cell", "aggressor radio node", "victim radio node", "network node" and "resources" have been used throughout this description, although any other corresponding nodes, functions, and/or parameters could also be used having the features and characteristics described here. The solution is defined by the appended claims.

The invention claimed is:

1. A method performed in a coordinating node of a wireless communication network, for coordinating uplink transmissions in a victim cell and in an aggressor cell, wherein the uplink transmissions in the aggressor cell potentially cause interference at a victim radio node receiving or measuring uplink signals transmitted in the victim cell, the method comprising:
    obtaining an indication of an uplink pattern of interference-protected resources in frequency and time where uplink transmissions are allowed to be scheduled in the victim cell but not in the aggressor cell, and wherein time refers to fractions of subframes, and
    signaling the indication of said uplink pattern to the aggressor radio node serving the aggressor cell to mitigate interference caused by uplink transmissions in the aggressor cell when receiving or measuring uplink signals on said interference-protected resources at the victim radio node, and
    wherein the uplink pattern comprises a predefined threshold for output power of UEs in the aggressor cell, the uplink pattern prohibiting uplink transmissions on the interference-protected resources in the aggressor cell for UEs requiring an amount of output power above the predefined threshold, the uplink pattern allowing uplink transmissions on the interference-protected resources in the aggressor cell for UEs requiring an amount of output power that is below the predefined threshold.

2. A method according to claim 1, wherein the coordinating node is any of: the victim radio node signaling the indication of said uplink pattern to the aggressor radio node and a network node signaling the indication of said uplink pattern to the aggressor radio node.

3. A method according to claim 1, wherein the victim radio node is one of a radio node serving the victim cell and a measuring radio node performing measurements on uplink signals transmitted in the victim cell.

4. A method according to claim 1, wherein the interference-protected resources are used in the victim cell for at least one of: transmission of signals on the Physical Uplink Shared Channel PUSCH, transmission of signals on the Physical Uplink Control Channel PUCCH, and transmission of Sounding Reference Signals SRS from a UE or a group of UEs to be measured by the victim radio node.

5. A method according to claim 1, wherein the signaled indication of said uplink pattern specifies at least one of: the interference-protected resources, non-protected resources where uplink transmissions are allowed in the aggressor cell, and a reference to said uplink pattern.

6. A method according to claim 1, wherein the uplink pattern is selected from a set of predefined uplink patterns or configured by a set of predefined parameters.

7. A method according to claim 1, wherein the uplink pattern is selected based on a current traffic load in at least one of the victim cell and the aggressor cell.

8. A method according to claim 1, wherein the signaled indication of said uplink pattern indicates whether the interference-protected resources should be used in the victim cell for PUSCH transmissions, PUCCH transmissions or SRS transmissions, respectively.

9. A method according to claim 1, wherein the signaled indication of said uplink pattern indicates at least one of: one or more frame numbers, one or more subframe numbers, one or more timeslot numbers, one or more SC-FDMA symbol numbers, one or more resource blocks, one or more frequency bands, one or more subcarrier numbers, a periodicity of the uplink pattern, a start reference time of the uplink pattern, and at least one parameter characterizing the uplink pattern.

10. A method according to claim 1, wherein the signaled indication of said uplink pattern comprises a bitmap with bits indicating protected and non-protected resources.

11. A method according to claim 10, wherein said bitmap comprises a first bit string indicating the protected and non-protected resources in time domain, and a second bit string indicating the protected and non-protected resources in frequency domain.

12. A method according to claim 1, wherein the victim radio node signals information regarding current usage of said interference-protected resources in the victim cell, to the aggressor radio node, thereby enabling the aggressor radio node to at least partly use any interference-protected resources not used in the victim cell.

13. A method according to claim 1, wherein the indication of said uplink pattern is signaled to at least one User Equipment UE.

14. A method according to claim 1, wherein the indication of said uplink pattern is signaled to a positioning node thereby enabling the positioning node to configure one or more UE or radio node positioning measurements in accordance with the uplink pattern.

15. A method according to claim 1, wherein the uplink transmissions in the victim cell comprise SRS, and the uplink transmissions in the aggressor cell comprise one or more of: PUSCH, PUCCH and SRS.

16. A method according to claim 1, wherein the aggressor cell is served by one of a macro radio base station and a femto radio base station, and the victim cell is served by one of a pico radio base station and a micro radio base station.

17. A coordinating node of a wireless communication network, configured to coordinate uplink transmissions in a victim cell and in an aggressor cell, wherein the uplink transmissions in the aggressor cell potentially cause interference at a victim radio node receiving or measuring uplink signals transmitted in the victim cell, the coordinating node comprising:
    a logic unit adapted to obtain an indication of an uplink pattern of interference-protected resources in frequency and where uplink transmissions are allowed to be scheduled in the victim cell but not in the aggressor cell, and wherein time refers to fractions of subframes, and
    a signaling unit adapted to signal the indication of said uplink pattern to the aggressor radio node serving the aggressor cell to mitigate interference caused by uplink transmissions in the aggressor cell when receiving or measuring uplink signals on said interference-protected resources at the victim radio node, and
    wherein the uplink pattern comprises a predefined threshold for output power of UEs in the aggressor cell, the uplink pattern prohibiting uplink transmissions on the interference-protected resources in the aggressor cell for a UE requiring an amount of output power above the predefined threshold, the uplink pattern allowing uplink transmissions on the interference-protected resources in the aggressor cell for UEs requiring an amount of output power that is below the predefined threshold.

18. A coordinating node according to claim 17, wherein the victim radio node is one of a radio node serving the victim cell and a measuring radio node performing measurements on uplink signals transmitted in the victim cell.

19. A coordinating node according to claim 17, wherein the interference-protected resources are used in the victim cell for at least one of: transmission of signals on the Physical Uplink Shared Channel PUSCH, transmission of signals on the Physical Uplink Control Channel PUCCH, and transmission of Sounding Reference Signals SRS from a UE or a group of UEs to be measured by the victim radio node.

20. A coordinating node according to claim 17, wherein the signaled indication of said uplink pattern specifies at least one of: the interference-protected resources, non-protected resources where uplink transmissions are allowed in the aggressor cell, and a reference to said uplink pattern.

21. A coordinating node according to claim 17, adapted to select the uplink pattern from a set of predefined uplink patterns or to configure the uplink pattern by a set of predefined parameters.

22. A coordinating node according to claim 17, adapted to select the uplink pattern based on a current traffic load in at least one of the victim cell and the aggressor cell.

23. A coordinating node according to claim 22, wherein the coordinating node is any of: the victim radio node signaling the indication of said uplink pattern to the aggressor radio node, the aggressor radio node signaling the indication of said uplink pattern to the victim radio node, and a network node signaling the indication of said uplink pattern to one or both of the victim radio node and the aggressor radio node.

24. A coordinating node according to claim 17, wherein the signaled indication of said uplink pattern indicates whether the interference-protected resources should be used in the victim cell for PUSCH transmissions, PUCCH transmissions or SRS transmissions, respectively.

25. A coordinating node according to claim 17, wherein the signaled indication of said uplink pattern indicates at least one of: one or more frame numbers, one or more subframe numbers, one or more timeslot numbers, one or more SC-FDMA symbol numbers, one or more resource blocks, one or more frequency bands, one or more subcarrier numbers, a periodicity of the uplink pattern, a start reference time of the uplink pattern, and at least one parameter characterizing the uplink pattern.

26. A coordinating node according to claim 17, adapted to signal the indication of said uplink pattern to at least one User Equipment UE.

27. A coordinating node according to claim 17, adapted to signal the indication of said uplink pattern to a positioning node thereby enabling the positioning node to configure one or more UE or radio node positioning measurements in accordance with the uplink pattern.

28. A coordinating node according to claim 17, wherein the uplink transmissions in the victim cell comprise SRS, and the uplink transmissions in the aggressor cell comprise one or more of: PUSCH, PUCCH and SRS.

29. A method performed in an aggressor node of a wireless communication network, for scheduling or configuring for uplink transmissions in an aggressor cell, wherein the uplink transmissions in the aggressor cell potentially cause interference at a victim radio node receiving or measuring uplink signals transmitted in the victim cell, the method comprising:
  receiving an indication of an uplink pattern of interference-protected resources in frequency and time where uplink transmissions are allowed to be scheduled in the victim cell but not in the aggressor cell, and wherein time refers to fractions of subframes, and
  using said uplink pattern for scheduling uplink transmissions in the aggressor cell, or for configuring at least one measurement or signal reception according to said uplink pattern, and
  wherein the uplink pattern comprises a predefined threshold for output power of UEs in the aggressor cell, the uplink pattern prohibiting uplink transmissions on the interference-protected resources in the aggressor cell for a UE requiring an amount of output power above the predefined threshold, the uplink pattern allowing uplink transmissions on the interference-protected resources in the aggressor cell for UEs requiring an amount of output power that is below the predefined threshold.

30. An aggressor node of a wireless communication network, the radio node being configured to schedule or configure for uplink transmissions in an aggressor cell, wherein the uplink transmissions in the aggressor cell potentially cause interference at a victim radio node receiving or measuring uplink signals transmitted in the victim cell, the aggressor radio node comprising:
  a receiving unit adapted to receive an indication of an uplink pattern of interference-protected resources in frequency and time where uplink transmissions are allowed to be scheduled in the victim cell but not in the aggressor cell, and wherein time refers to fractions of subframes, and
  a using unit adapted to use said uplink pattern for scheduling uplink transmissions in the aggressor cell, or for configuring at least one measurement or signal reception according to said uplink pattern, and
  wherein the uplink pattern comprises a predefined threshold for output power of UEs in the aggressor cell, the uplink pattern prohibiting uplink transmissions on the interference-protected resources in the aggressor cell for a UE requiring an amount of output power above the predefined threshold, the uplink pattern allowing uplink transmissions on the interference-protected resources in the aggressor cell for UEs requiring an amount of output power that is below the predefined threshold.

* * * * *